US012603287B2

(12) United States Patent
Kang et al.

(10) Patent No.: US 12,603,287 B2
(45) Date of Patent: Apr. 14, 2026

(54) ELECTRODE ACTIVE MATERIAL FOR SECONDARY BATTERY AND METHOD OF MANUFACTURING SAME

(71) Applicant: LG Energy Solution, Ltd., Seoul (KR)

(72) Inventors: Joon Koo Kang, Daejeon (KR); Il Ha Lee, Daejeon (KR); Ki Hwan Kim, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 575 days.

(21) Appl. No.: 18/020,746

(22) PCT Filed: Aug. 19, 2021

(86) PCT No.: PCT/KR2021/011061
§ 371 (c)(1),
(2) Date: Feb. 10, 2023

(87) PCT Pub. No.: WO2022/039535
PCT Pub. Date: Feb. 24, 2022

(65) Prior Publication Data

US 2023/0307647 A1 Sep. 28, 2023

(30) Foreign Application Priority Data

Aug. 21, 2020 (KR) ........................ 10-2020-0105567

(51) Int. Cl.
*H01M 4/505* (2010.01)
*H01M 4/04* (2006.01)
(Continued)

(52) U.S. Cl.
CPC ......... *H01M 4/622* (2013.01); *H01M 4/0404* (2013.01); *H01M 4/505* (2013.01); *H01M 4/525* (2013.01)

(58) Field of Classification Search
None
See application file for complete search history.

(56) References Cited

U.S. PATENT DOCUMENTS

| | | | |
|---|---|---|---|
| 2014/0154572 | A1 | 6/2014 | Singh et al. |
| 2017/0117540 | A1 | 4/2017 | Ota |

(Continued)

FOREIGN PATENT DOCUMENTS

| | | | |
|---|---|---|---|
| CN | 105390678 | A | 3/2016 |
| CN | 108511744 | A | 9/2018 |

(Continued)

OTHER PUBLICATIONS

Thiophene-initiated polymeric artificial cathode-electrolyte interface for Ni-rich cathode material (Year: 2018).*

(Continued)

*Primary Examiner* — Mark Ruthkosky
*Assistant Examiner* — Sarah J Jacobson
(74) *Attorney, Agent, or Firm* — Lerner David LLP

(57) ABSTRACT

The present application provides an electrode active material having excellent electrical conductivity and ionic conductivity as well as excellent mechanical flexibility by forming a unique conductive polymer layer on an active material core, while preventing side reactions between the active material core and an electrolyte from occurring, and an electrode comprising the same. Accordingly, it is possible to provide a lithium secondary battery having an excellent capacity retention ratio (lifetime characteristics) according to charging/discharging while having a high energy density. The conductive polymer layer includes a thiophene-based polymer having one or more functional groups selected from the group consisting of a carboxyl group, a hydroxyl group, an amine group, a nitro group, an ether group, a carbonyl group and a flowable functional group.

16 Claims, 3 Drawing Sheets

(51) Int. Cl.

| | |
|---|---|
| ***H01M 4/525*** | (2010.01) |
| ***H01M 4/62*** | (2006.01) |

(56) References Cited

U.S. PATENT DOCUMENTS

| | | | |
|---|---|---|---|
| 2017/0149058 | A1 | 5/2017 | Ota et al. |
| 2018/0062175 | A1 | 3/2018 | Choi |
| 2019/0190027 | A1 | 6/2019 | Takeshita et al. |

FOREIGN PATENT DOCUMENTS

| | | | |
|---|---|---|---|
| JP | 2013104031 | A | 5/2013 |
| JP | 2016009524 | A | 1/2016 |
| JP | 6390228 | B2 | 9/2018 |
| KR | 20060084886 | A | 7/2006 |
| KR | 20070016431 | A | 2/2007 |
| KR | 20140070258 | A | 6/2014 |
| KR | 20180025686 | A | 3/2018 |
| KR | 20190074969 | A | 6/2019 |
| WO | 2010113876 | A1 | 10/2010 |

OTHER PUBLICATIONS

Balancing Charge Storage and Mobility in an Oligo(Ether) Functionalized Dioxythiophene Copolymer for Organic- and Aqueous-Based Electrochemical Devices and Transistors (Year: 2018).*

Anonymous Nuha et al: "lonically-Functionalized Poly(thiophene) Conductive Polymers as Binders for Silicon and Graphite Anodes for Li-Ion Batteries—Salem—2015—Energy Technology—Wiley Online Library", Energy Technology, vol. 4, No. 2, Feb. 1, 2016 (Feb. 1, 2016), pp. 331-340.

Extended European Search Report including Written Opinion for Application No. 21858622.0 dated Sep. 24, 2024. 11 pgs.

Kwon Yo Han et al: "Carbon Nanotube Web with Carboxylated Polythiophene "Assist" for High-Performance Battery Electrodes", ACS NANO, vol. 12, No. 4, Jan. 1, 2018 (Jan. 1, 2018), pp. 3126-3139.

International Search Report for PCT/KR2021/011061 mailed Dec. 10, 2021. 4 pages.

* cited by examiner

[Figure 1]
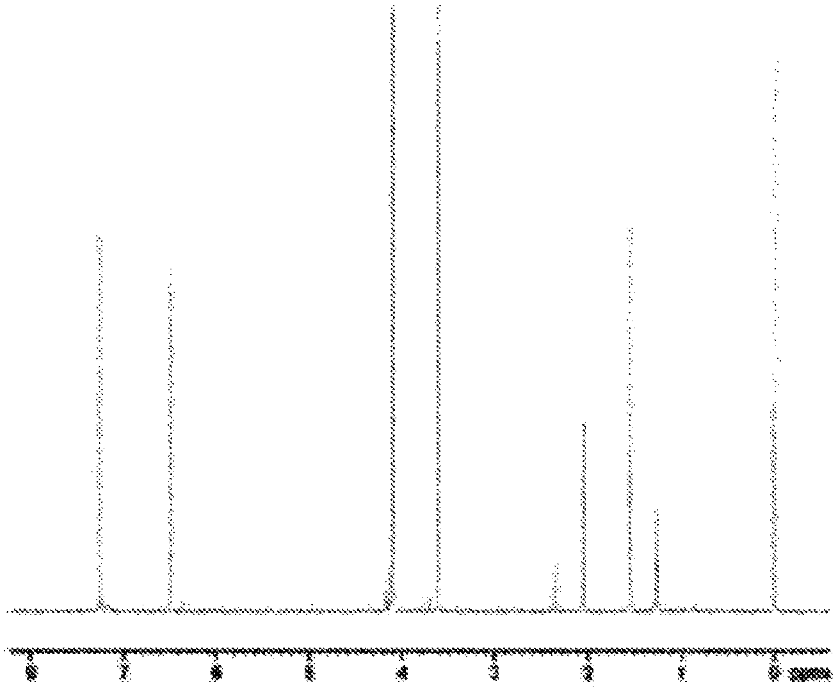
[Figure 2]
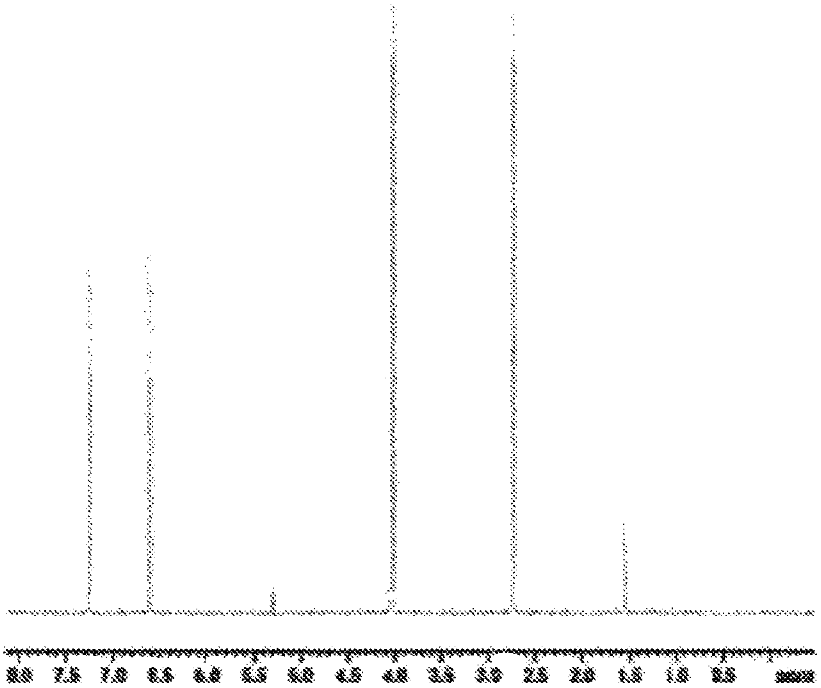

[Figure 3]
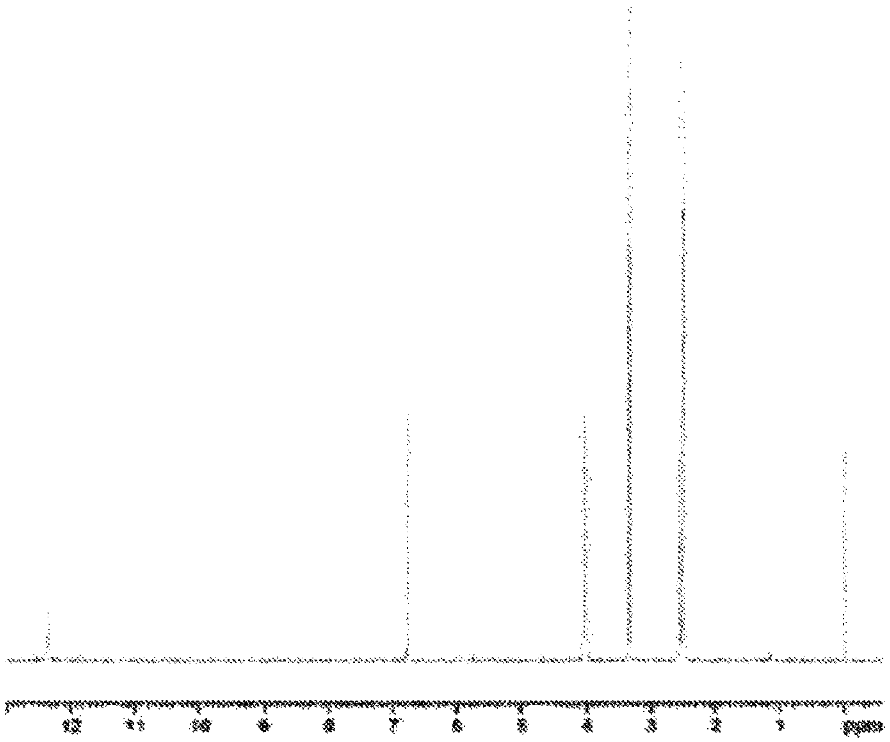
[Figure 4]
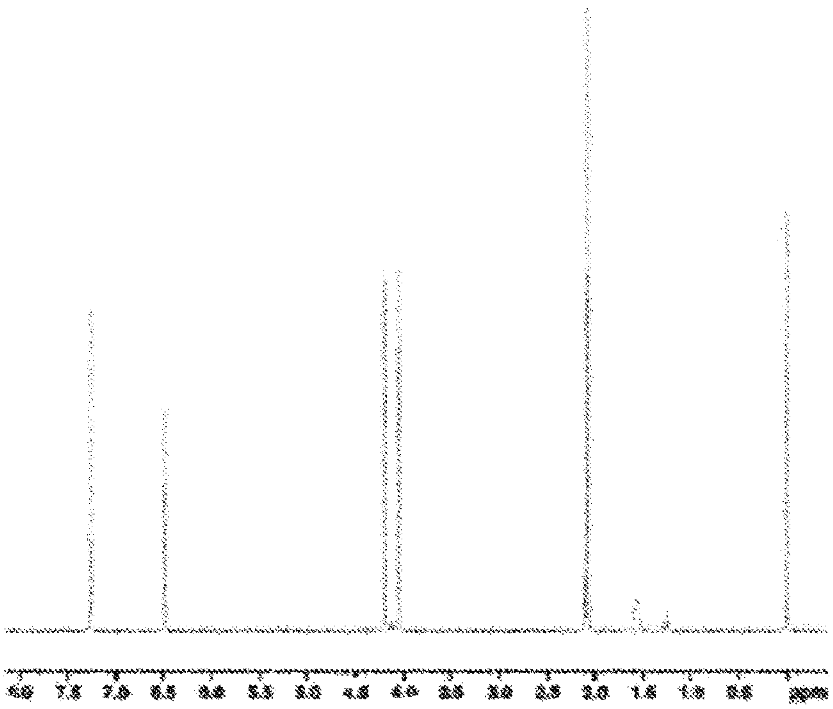

[Figure 5]
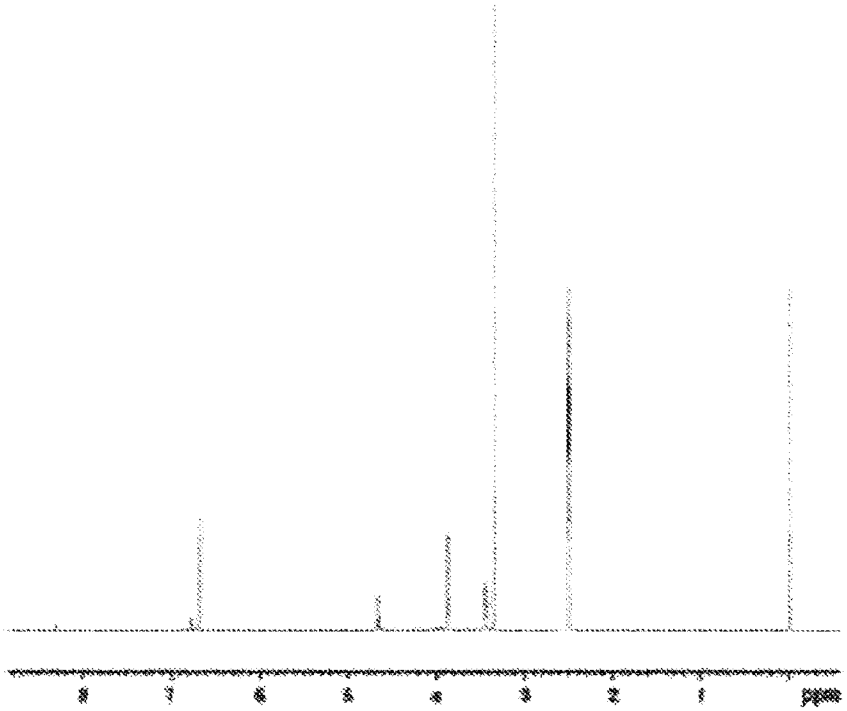

ELECTRODE ACTIVE MATERIAL FOR SECONDARY BATTERY AND METHOD OF MANUFACTURING SAME

CROSS-REFERENCE TO RELATED APPLICATIONS

This application is a national phase entry under 35 U.S.C. § 371 of International Application No. PCT/KR2021/011061, filed on Aug. 19, 2021, which claims priority from Korean Patent Application No. 10-2020-0105567 filed on Aug. 21, 2020, the disclosures of which are incorporated herein by reference in their entireties.

TECHNICAL FIELD

The present application relates to an electrode active material, an electrode and a lithium secondary battery manufactured therefrom.

BACKGROUND ART

Lithium secondary batteries are rechargeable, easily portable, and have high power, thereby being widely used as high-efficiency energy storage and supply elements for driving electric vehicles, portable electronic devices and/or ultracompact appliance devices, and the like.

Lithium secondary batteries generally use lithium transition metal oxides as a positive electrode active material, and use, for example, lithium-containing cobalt oxides such as $LiCoO_2$, lithium-containing manganese oxides such as $LiMnO_2$ with a layered crystal structure and $LiMn_2O_4$ with a spinel crystal structure, or lithium-containing nickel oxides such as $LiNiO_2$.

Among the positive electrode active materials, the lithium-containing cobalt oxides such as $LiCoO_2$ have been widely used due to excellent various physical properties such as excellent cycle characteristics, but have a limitation in mass use as a power source in fields such as electric vehicles due to low stability and a resource limitation of cobalt. In addition, the lithium-containing manganese oxides such as $LiMnO_2$ and/or $LiMn_2O_4$ have advantages of being abundant in resources and environmentally friendly, but have limitations that they have small capacity and poor cycle characteristics.

Meanwhile, the lithium-containing nickel oxides such as $LiNiO_2$ attract attention because they can exhibit a high discharged capacity when charged while having a lower cost than the lithium-containing cobalt oxides. However, there is a problem that the lithium-containing nickel oxide reacts with an electrolyte or the like during storage or cycle to generate an excessive amount of gas.

Accordingly, a lithium transition metal oxide, in which a part of nickel is substituted with other transition metals such as manganese and cobalt, has been proposed. However, when such a metal-substituted nickel-based lithium transition metal oxide is used as an electrode active material without surface treatment or the like, a side reaction with an electrolyte or a local structure change of the electrode active material occurs, so that the stability problem of the electrode is not sufficiently solved, and when a protective layer is introduced to solve this problem, there is a problem that ionic conductivity and electrical conductivity are lowered, and thus performance is lowered.

Technical Problem

It is one object of the present application to provide an electrode active material having excellent electrical conductivity and ionic conductivity as well as excellent mechanical flexibility by forming a unique conductive polymer layer on an active material core, while preventing side reactions between the active material core and an electrolyte from occurring, and it is another object of the present application to provide an electrode comprising the same.

It is another object of the present application to provide a lithium secondary battery using the electrode active material and/or electrode and having an excellent capacity retention ratio (lifetime characteristics) according to charging/discharging while having a high energy density.

Technical Solution

Among the physical properties mentioned in this specification, when the measurement temperature and/or pressure affects the physical property value, the relevant physical property means a physical property measured at room temperature and/or normal pressure, unless otherwise specified.

In the present application, the term room temperature is a natural temperature without warming or cooling, which may mean, for example, any temperature within the range of about 10° C. to 30° C., or a temperature of 25° C. or 23° C. or so.

In the present application, the term normal pressure is a pressure not particularly reduced or increased, which may usually be 1 atmosphere or so, such as atmospheric pressure.

The present application may relate to an electrode active material comprising, for example, an active material core and a conductive polymer layer present on a surface of the active material core. In this specification, the conductive polymer may mean an organic polymer having conductivity sufficient to conduct electricity.

Advantageous Effects

The present application can provide an electrode active material having excellent electrical conductivity and ionic conductivity as well as excellent mechanical flexibility by forming a unique conductive polymer layer on an active material core, while preventing side reactions between the active material core and an electrolyte from occurring, and an electrode comprising the same. Accordingly, it can provide a lithium secondary battery having an excellent capacity retention ratio (lifetime characteristics) according to charging/discharging while having a high energy density.

DESCRIPTION OF DRAWINGS

FIG. 1 is a graph of $H^1$-NMR analysis results of compound 1.

FIG. 2 is a graph of $H^1$-NMR analysis results of compound 1a.

FIG. 3 is a graph of $H^1$-NMR analysis results of compound 2.

FIG. 4 is a graph of $H^1$-NMR analysis results of compound 1b.

FIG. 5 is a graph of $H^1$-NMR analysis results of compound 3.

DETAILED DESCRIPTION

In the present application, the active material core may comprise, for example, a lithium nickel-manganese-cobalt oxide represented by Formula 1 below.

$$Li_xM_yO_2 \quad \text{[Formula 1]}$$

In Formula 1, M may be represented by $Ni_{1-a-b}Mn_aCo_b$, wherein a may be in a range of 0.05 to 0.4, b may be in a range of 0.05 to 0.4, 1-a-b may be in a range of 0.2 to 0.9, x may be in a range of 0.95 to 1.15, and y may be 2-x.

The lithium nickel-manganese-cobalt oxide represented by Formula 1 above may include Li in a molar content corresponding to x. In this specification, the molar content may be, for example, a value relatively determined in the relationship between Li, M and/or O in Formula 1, or in another example, it may mean a value relatively determined in the relationship between Ni, Mn and/or Co included in M in Formula 1. In another example, x in Formula 1 above may be 0.6 or more, 0.7 or more, 0.8 or more, or 0.9 or more, or may be 1.4 or less, 1.3 or less, 1.2 or less, or 1.1 or less. When Li is included in the molar content within the above range, the battery may have excellent power and/or capacity characteristics, and the like.

In Formula 1 above, Ni may be included in a molar content corresponding to 1-a-b, or in another example, in a molar content of 0.25 or more, 0.30 or more, 0.35 or more, 0.40 or more, 0.45 or more, 0.50 or more, 0.55 or more, 0.60 or more, 0.65 or more, 0.70 or more, or 0.75 or more, or of 0.85 or less, 0.80 or less, 0.75 or less, 0.70 or less, 0.65 or less, 0.60 or less, or 0.55 or less. As the molar content of divalent nickel increases, the amount of electric charge capable of moving lithium ions increases, so that a high-capacity lithium secondary battery can be implemented.

In Formula 1 above, Mn may be included in a molar content corresponding to a, or in another example, in a molar content of 0.06 or more, 0.07 or more, 0.08 or more, 0.09 or more, 0.10 or more, 0.11 or more, 0.12 or more, 0.13 or more, 0.14 or more, 0.15 or more, 0.16 or more, 0.17 or more, 0.18 or more, 0.19 or more, 0.20 or more, 0.21 or more, 0.22 or more, 0.23 or more, 0.24 or more, 0.25 or more, 0.26 or more, 0.27 or more, 0.28 or more, or 0.29 or more, or of 0.39 or less, 0.38 or less, 0.37 or less, 0.36 or less, 0.35 or less, 0.34 or less, 0.33 or less, 0.32 or less, 0.31 or less, 0.30 or less, 0.29 or less, 0.28 or less, 0.27 or less, 0.26 or less, 0.25 or less, 0.24 or less, 0.23 or less, 0.22 or less, 0.21 or less, 0.20 or less, 0.19 or less, 0.18 or less, 0.17 or less, 0.16 or less, 0.15 or less, 0.14 or less, 0.13 or less, 0.12 or less, or 0.11 or less, which may be preferable in terms of stability of the electrode active material.

In Formula 1 above, Co may be included in a molar content corresponding to b, or in another example, in a molar content of 0.03 or more, 0.04 or more, 0.05 or more, 0.06 or more, 0.07 or more, 0.08 or more, 0.09 or more, 0.10 or more, 0.11 or more, 0.12 or more, 0.13 or more, 0.14 or more, 0.15 or more, 0.16 or more, 0.17 or more, 0.18 or more, or 0.19 or more, or of 0.39 or less, 0.38 or less, 0.37 or less, 0.36 or less, 0.35 or less, 0.34 or less, 0.33 or less, 0.32 or less, 0.31 or less, 0.30 or less, 0.29 or less, 0.28 or less, 0.27 or less, 0.26 or less, 0.25 or less, 0.24 or less, 0.23 or less, 0.22 or less, 0.21 or less, 0.20 or less, 0.19 or less, 0.18 or less, 0.17 or less, 0.16 or less, 0.15 or less, 0.14 or less, 0.13 or less, 0.12 or less, or 0.11 or less, which may be preferable in terms of cost.

In the present application, the lithium nickel-manganese-cobalt oxide represented by Formula 1 may have an average particle diameter ($D_{50}$) in a range of about 3 to 20 μm, but it is not limited thereto, and may vary depending on the Ni content and the like. In this specification, the average particle diameter may mean, for example, an average particle diameter when the lithium nickel-manganese-cobalt oxide represented by Formula 1 is in the form of secondary particles. Here, the secondary particles may mean, for example, particles in a state in which primary particles formed by mixing a compound containing nickel, cobalt and/or manganese with a lithium raw material source, and calcining the mixture, are aggregated. If the $D_{50}$ is too small, the amount of binder used may be increased, and if the $D_{50}$ is too large, the energy density may be reduced, so that it may be preferable to appropriately control the average particle diameter of the lithium nickel-manganese-cobalt oxide.

The present application may relate to an electrode active material comprising, for example, a conductive polymer layer on the surface of such an active material core. The active material core comprising the lithium nickel-manganese-cobalt oxide represented by Formula 1 as above has the advantage that a high-capacity battery can be implemented at a relatively low cost, but there may be problems such as generation of $CO_2$ gas according to a side reaction with the electrolyte solution during storage or charging/discharging of the battery, occurrence of a swelling phenomenon of the battery therefrom, occurrence of a local structure change of the active material core, and reduction of the capacity retention ratio therefrom. In this regard, the present inventors have confirmed that by forming a conductive polymer layer having features to be described below on such an active material core, it is possible to provide an electrode active material capable of implementing a battery having excellent capacity characteristics as well as excellent stability and capacity retention ratios according to charging/discharging or the like. Also, in the case of forming a protective layer comprising a non-conductive oxide on the active material core in order to solve the above problems, there may be a problem that electrochemical performance such as conductivity is lowered by affecting the movement path of ions, and the like, but the present inventors have also confirmed that by introducing a conductive polymer capable of having excellent conductivity, it is possible to provide an electrode active material capable of realizing a battery having excellent performance and stability.

In the present application, the conductive polymer layer may comprise, for example, a thiophene-based polymer having one or more functional groups.

In this specification, the term thiophene-based polymer may mean a polymer comprising a polymerization unit of a thiophene-based monomer in an amount of about 50 mol % or more, about 55 mol % or more, about 60 mol % or more, about 65 mol % or more, about 70 mol % or more, about 75 mol % or more, about 80 mol % or more, about 85 mol % or more, or about 90 mol % or more based on the total polymerization units of the polymer. The upper limit of the polymerization unit ratio of the thiophene-based monomer in the thiophene-based polymer is not particularly limited, which may be, for example, about 100 mol % or less, about 95 mol % or less, or about 90 mol % or less or so. Here, the polymerization unit of the thiophene-based monomer may be exemplified by a compound of Formula 3, 4 or 5 to be described below.

The thiophene-based polymer may be a conjugated polymer. The conjugated polymer has a π-conjugated structure formed by repetition of single bonds and double bonds, thereby showing lower band gap energy than the existing polymers, and thus may have excellent electrical conductivity and/or ionic conductivity.

Conventionally, as the thiophene-based polymer, a conjugated polymer generally obtained by polymerizing one or more monomers selected from the group consisting of 3,4-ethylenedioxythiophene (EDOT), alkyl substituted 3,4-ethylenedioxythiophene, phenyl-substituted 3,4-ethylenedioxythiophene, dimethyl substituted 3,4-ethylenedioxythiophene, cyanobiphenyl substituted 3,4-ethylenedioxythiophene, tetradecyl substituted 3,4-ethylenedioxythiophene, dibenzyl substituted 3,4-ethylenedioxythiophene, 3,4-propylenedioxythiophene (ProDOT), alkyl substituted 3,4-propylenedioxythiophene, phenyl substituted 3,4-propylenedioxythiophene, dimethyl substituted 3,4-propylenedioxyitophene, cyanobiphenyl substituted 3,4-propylenedioxythiophene, tetradecyl substituted 3,4-propylenedioxythiophene, dibenzyl substituted 3,4-propylenedioxythiophene, polystyrene sulfonic acid, polyacrylic acid, and poly-2-acrylamido-2-methylpropane sulfonic acid was used.

However, the thiophene-based monomer as above has a disadvantage that fluidity and dispersibility are lowered in a mixture of monomers for polymerizing the thiophene-based polymer and/or a composition for forming a thiophene-based polymer on the surface of the active material core. In addition, in the thiophene-based polymer obtained by polymerizing the thiophene-based monomers as above, adhesion force to the active material core and the like is lowered, so that there is a problem such as poor durability of the conductive polymer layer during the manufacture, storage and/or use (charging/discharging) of the battery. In this regard, the present inventors have confirmed that the above problems can be solved by forming a conductive polymer layer comprising a thiophene-based polymer having a unique functional group in a predetermined range on the surface of the active material core.

In the present application, the functional group included in the thiophene-based polymer (and/or thiophene-based monomer) may be selected from the group consisting of, for example, a carboxyl group, a hydroxyl group, an amine group, a nitro group, an ether group, a carbonyl group and/or a flowable functional group.

In this specification, the carboxyl group, hydroxyl group, amine group, nitro group, ether group and/or carbonyl group may each be, for example, a carboxyl group, a hydroxyl group, an amine group, a nitro group, an ether group and/or a carbonyl group itself, or may each mean a carboxyl group, hydroxyl group, amine group, nitro group, ether group and/or carbonyl group-containing group. In this specification, the carboxyl group, hydroxyl group, amine group, nitro group, ether group and/or carbonyl group-containing group may mean including, for example, an alkyl group, an alkylene group, an alkoxy group, an alkenyl group, an alkenylene group and/or an aryl group, and the like is substituted with one or more functional groups, such as a carboxyl group, a hydroxyl group, an amine group, a nitro group, an ether group and/or a carbonyl group. In one example, the carboxyl group, the hydroxyl group, the amine group, the nitro group, the ether group and/or the carbonyl group may mean including a carboxylalkyl group, a hydroxyalkyl group, an aminealkyl group, a nitroalkyl group, an etheralkyl group and/or a carbonylalkyl group containing an alkyl group having 1 to 20 carbon atoms, 1 to 12 carbon atoms, 1 to 8 carbon atoms, or 1 to 4 carbon atoms, respectively, where the alkyl group or the alkylene group may be linear, branched or cyclic, and suitably may be linear or branched. In addition, the amine group may be, for example, a primary amine, a secondary amine, or a tertiary amine, but may be more preferably a primary amine, and the carbonyl group may be included, for example, in an amide group or an acyl chloride group.

The present application can provide an electrode active material, in which side reactions between the active material core and the electrolyte solution are properly controlled, having also excellent mechanical flexibility, while having excellent conductivity, by forming a conductive polymer layer comprising a thiophene-based polymer (and/or a thiophene-based monomer) having the above functional group on the surface of the active material core. It is possible to provide an electrode active material that is properly controlled and has excellent mechanical flexibility. In addition, by comprising such an electrode active material, it is possible to provide a lithium secondary battery capable of exhibiting a high energy density, an excellent capacity retention ratio, and the like.

The thiophene-based polymer (and/or thiophene-based monomer) of the present application includes the functional group such as a carboxyl group, a hydroxyl group, an amine group, a nitro group, an ether group and/or a carbonyl group, whereby the thiophene-based polymer may have excellent adhesion force to the active material core. The thiophene-based polymer (and/or thiophene-based monomer) including such a functional group is subjected to chemical bonding, for example, hydrogen bonding, with oxygen or hydroxyl groups on the surface of the active material core, whereby it may implement excellent adhesion force to the active material core. As such, the electrode active material, which comprises the conductive polymer layer comprising the thiophene-based polymer having excellent adhesion force to the active material core, may have particularly excellent mechanical flexibility and excellent durability in a process, such as storing and/or charging/discharging the battery, and the like.

The thiophene-based polymer (and/or thiophene-based monomer) of the present application may also contain the flowable functional group as above, whereby it may have excellent fluidity and the like in a monomer mixture for forming a thiophene-based polymer and/or a composition (hereinafter, referred to as a thiophene-based polymer composition) for forming the thiophene-based polymer on the surface of the active material core, and thus polymerization from the thiophene-based monomer to the thiophene-based polymer can occur with excellent efficiencies, or the thiophene-based polymer can be formed on the surface of the active material core with excellent efficiencies.

Here, the type of the flowable functional group is not particularly limited as long as it plays the above role, but the present inventors have confirmed that in particular, a chain having a length of a certain level or more effectively imparts flowability to the monomer mixture and/or the thiophene-based polymer composition.

The flowable functional group may be exemplified by an alkyl group with 3 or more carbon atoms, an alkoxy group with 3 or more carbon atoms, a carbonyl group with 3 or more carbon atoms (alkylcarbonyl group or carbonylalkyl group, having an alkyl group with 3 or more carbon atoms), a carbonyloxy group with 3 or more carbon atoms (cabonyloxy group having an alkyl group with 3 or more carbon atoms), or a functional group of Formula 2 below, and in general, use an alkyl group with 3 or more carbon atoms, an alkoxy group with 3 or more carbon atoms and/or a functional group of Formula 2 below, but is not limited thereto.

[Formula 2]

$$-L_1-O-\left[L_2-O\right]_n-R_1$$

In Formula 2, $L_1$ may be a single bond or an alkylene group, $L_2$ may be an alkylene group, $R_1$ may be an alkyl group, and n may be a number within a range of 1 to 10.

In one example, the alkyl group (except $R_1$ in Formula 2) or alkoxy group as the flowable functional group may have 4 or more, 5 or more, or 6 or more carbon atoms, and the carbon number thereof may be 20 or less, 18 or less, 16 or less, 14 or less, 12 or less, 10 or less, 8 or less, 6 or less, or 5 or less or so. The alkyl group or alkoxy group may be linear, branched or cyclic, and may be suitably linear or branched.

In one example, the alkyl group of $R_1$ in Formula 2 may be an alkyl group with 1 to 20 carbon atoms, 1 to 16 carbon atoms, 1 to 12 carbon atoms, 1 to 8 carbon atoms, or 1 to 4 carbon atoms, or may be a methyl group or an ethyl group. The alkyl group may be linear, branched or cyclic, and may be suitably linear or branched.

In one example, the alkylene group of $L_1$ and $L_2$ in Formula 2 may be an alkylene group with 1 to 20 carbon atoms, 1 to 16 carbon atoms, 1 to 12 carbon atoms, 1 to 8 carbon atoms, or 1 to 4 carbon atoms, or may be an alkylene group with 2 to 4 carbon atoms. The alkylene group may be linear, branched or cyclic, and may be suitably linear or branched.

In another example, n in Formula 2 may be 2 or more, or 3 or more, or may be 9 or less, 8 or less, 7 or less, 6 or less, or 5 or less, from the viewpoint of fluidity and/or intermolecular packing efficiency in the thiophene-based monomer mixture or thiophene-based polymer composition.

In the present application, it may be preferable that the thiophene-based polymer (and/or thiophene-based monomer) includes, for example, the above-described carboxyl group, hydroxyl group, amine group, nitro group, ether group, carbonyl group and/or flowable functional group in an appropriate amount, from the viewpoint of securing appropriate fluidity and/or dispersibility in the thiophene-based monomer mixture or the thiophene-based polymer composition, and the like, or controlling the deterioration of elution properties according to lowering of the packing density in the conductive polymer layer, and the like.

In this specification, the inclusion of the functional group in an appropriate amount may mean that for example, the ratio of the mole number of the functional group to the mole number (S) of sulfur in the thiophene-based polymer (and/or thiophene-based monomer) is within an appropriate range.

In one example, the ratio (M/S) of the mole number (M) of one or more functional groups selected from the group consisting of the carboxyl group, hydroxyl group, amine group, nitro group, ether group, carbonyl group and/or flowable functional group relative to the mole number (S) of sulfur contained in the thiophene-based polymer (and/or thiophene-based monomer) may be in the range of approximately 0.1 to 10. By controlling the ratio (M/S) in such a range, the desired thiophene-based polymer can be appropriately formed through efficient polymerization of the thiophene-based monomers, and the conductive polymer layer comprising the thiophene-based polymer has an excellent packing density, and has excellent adhesion force to the active material core, so that it is possible to implement an electrode active material having excellent elution properties, capacity retention ratios, and the like. In another example, the ratio (M/S) may be approximately 0.2 or more, approximately 0.3 or more, approximately 0.4 or more, approximately 0.5 or more, approximately 0.6 or more, approximately 0.7 or more, approximately 0.8 or more, approximately 0.9 or more, approximately 1.0 or more, approximately 1.1 or more, approximately 1.2 or more, approximately 1.3 or more, approximately 1.4 or more, approximately 1.5 or more, approximately 1.6 or more, approximately 1.7 or more, approximately 1.8 or more, or approximately 1.9 or more, or may be approximately 9.5 or less, approximately 9.0 or less, approximately 8.5 or less, approximately 8.0 or less, approximately 7.5 or less, approximately 7.0 or less, approximately 6.5 or less, approximately 6.0 or less, approximately 5.5 or less, approximately 5.0 or less, approximately 4.5 or less, approximately 4.0 or less, approximately 3.5 or less, approximately 3.0 or less, approximately 2.5 or less, approximately 2.4 or less, approximately 2.3 or less, approximately 2.2 or less, or approximately 2.1 or less, but is not limited thereto.

The electrode active material of the present application may use a thiophene-based polymer (and/or thiophene-based monomer) comprising a first functional group and a second functional group simultaneously in order to have proper fluidity to the monomer mixture and the like while securing excellent adhesion force between the thiophene-based polymer and the active material core. Here, the first functional group may be, for example, selected from the group consisting of the above-described carboxyl group, hydroxyl group, amine group, nitro group, ether group and/or carbonyl group, and the second functional group may be, for example, the above-described flowable functional group.

In one example, the thiophene-based polymer (and/or thiophene-based monomer) may be controlled so that the ratio ((M1+M2)/S) of the sum of the mole number (M1) of the first functional group and the mole number (M2) of the second functional group relative to the mole number (S) of sulfur is in a range of about 0.1 to 10. In another example, the ratio ((M1+M2)/S) may be approximately 0.2 or more, approximately 0.3 or more, approximately 0.4 or more, approximately 0.5 or more, approximately 0.6 or more, approximately 0.7 or more, approximately 0.8 or more, approximately 0.9 or more, approximately 1.0 or more, approximately 1.1 or more, approximately 1.2 or more, approximately 1.3 or more, approximately 1.4 or more, approximately 1.5 or more, approximately 1.6 or more, approximately 1.7 or more, approximately 1.8 or more, or approximately 1.9 or more, or may be approximately 9.5 or less, approximately 9.0 or less, approximately 8.5 or less, approximately 8.0 or less, approximately 7.5 or less, approximately 7.0 or less, approximately 6.5 or less, approximately 6.0 or less, approximately 5.5 or less, approximately 5.0 or less, approximately 4.5 or less, approximately 4.0 or less, approximately 3.5 or less, approximately 3.0 or less, approximately 2.5 or less, approximately 2.4 or less, approximately 2.3 or less, approximately 2.2 or less, or approximately 2.1 or less.

In addition, the ratio of the mole number (M2) of the second functional group to the mole number (M1) of the first functional group in the thiophene-based polymer (and/or thiophene-based monomer) may be, for example, within the range of approximately 0.1 to 10, and in another example, it may be approximately 0.2 or more, approximately 0.3 or more, or approximately 0.4 or more, or may be approximately 9.5 or less, approximately 9.0 or less, approximately 8.5 or less, approximately 8.0 or less, approximately 7.5 or less, approximately 7.0 or less, approximately 6.5 or less, approximately 6.0 or less, approximately 5.5 or less, approximately 5.0 or less, approximately 4.5 or less, approximately 4.0 or less, approximately 3.5 or less, approximately 3.0 or less, or approximately 2.5 or less.

In the present application, by controlling the ratio ((M1+M2)/S) of the sum (M1+M2) of the mole number (M1) of the first functional group and the mole number (M2) of the second functional group relative to the mole number (S) of sulfur in the thiophene-based polymer and/or the ratio of the mole number (M2) of the second functional group to the mole number (M1) of the first functional group to be within the above ranges, the thiophene-based monomer mixture, the thiophene-based polymer composition, or the like has appropriate fluidity, whereby the polymerization of the thiophene-based polymer can be effectively performed, the conductive polymer layer can be effectively formed on the active material core, and simultaneously the thiophene-based polymer can have excellent adhesion force to the active material core. Accordingly, it is possible to provide an electrode active material or the like having excellent electrical conductivity and ionic conductivity as well as excellent mechanical flexibility while preventing side reactions between the active material core and an electrolyte from occurring.

The thiophene-based polymer of the present application may comprise, for example, polymerization units having the following formulas.

In one example, the thiophene-based polymer may include a polymerization unit of Formula 3 below.

[Formula 3]

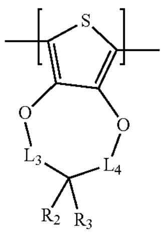

In Formula 3, $L_3$ and/or $L_4$ may each independently be a single bond or an alkylene group, $R_2$ may be a carboxyl group, a hydroxyl group, an amine group, a nitro group, an ether group, a carbonyl group, or a flowable functional group, and $R_3$ may be hydrogen, a carboxyl group, a hydroxyl group, an amine group, a nitro group, an ether group, a carbonyl group, or a flowable functional group.

$R_2$ and/or $R_3$ in Formula 3 may be the same or different. The flowable functional group of $R_2$ and/or $R_3$ in Formula 3 may be the same as the flowable functional group described above.

In one example, the alkylene group of $L_3$ and/or $L_4$ in Formula 3 may each independently be an alkylene group with 1 to 20 carbon atoms, 1 to 16 carbon atoms, 1 to 12 carbon atoms, 1 to 8 carbon atoms, or 1 to 4 carbon atoms. The alkylene group may be linear, branched or cyclic, and may be suitably linear or branched.

The role of each of a carboxyl group, a hydroxyl group, an amine group, a nitro group, an ether group, a carbonyl group and/or a flowable functional group in Formula 3 may be as described above. In the present application, $R_2$ and/or $R_3$ may be appropriately selected in consideration of the above-described roles, effects, and the like.

In the polymerization unit of Formula 3, at least one of $L_3$ and $L_4$ may be an alkylene group, and the number of carbon atoms present in $L_3$ and $L_4$ may be in the range of 2 to 10. In this specification, the number of carbon atoms present in $L_3$ and $L_4$ may mean the sum of the number of carbon atoms present in $L_3$ and the number of carbon atoms present in $L_4$. In another example, the number of carbon atoms present in $L_3$ and $L_4$ may be 9 or less, 8 or less, 7 or less, 6 or less, 5 or less, 4 or less, or 3 or less.

Also, in the present application, in order to provide that the monomer mixture has adequate fluidity, whereby the polymerization of the thiophene-based polymer can be effectively performed and simultaneously the thiophene-based polymer has excellent adhesion force to the active material core, in the thiophene-based polymer, for example, the polymerization unit of Formula 4 below and the polymerization unit of Formula 5 below may be included at the same time.

[Formula 4]

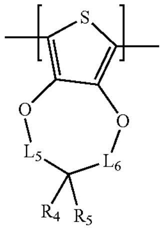

In Formula 4, $L_5$ and $L_6$ may each independently be a single bond or an alkylene group, $R_4$ may be a carboxyl group, a hydroxyl group, an amine group, a nitro group, an ether group, or a carbonyl group, and $R_5$ may be hydrogen, a carboxyl group, a hydroxyl group, an amine group, a nitro group, an ether group, or a carbonyl group:

[Formula 5]

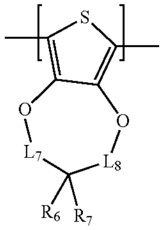

In Formula 5, $L_7$ and $L_8$ may each independently be a single bond or an alkylene group, $R_6$ may be a flowable functional group, and $R_7$ may be hydrogen or a flowable functional group.

$R_4$ and/or $R_5$ of Formula 4 may be the same or different. The contents of the carboxyl group, hydroxyl group, amine group, nitro group, ether group and/or carbonyl group, and the like may be the same as described above.

In one example, the alkylene group of $L_5$ and/or $L_6$ in Formula 4 and/or the alkylene group of $L_7$ and/or $L_8$ in Formula 5 may each independently be an alkylene group with 1 to 20 carbon atoms, 1 to 16 carbon atoms, 1 to 12 carbon atoms, 1 to 8 carbon atoms, or 1 to 4 carbon atoms. The alkylene group may be linear, branched or cyclic, and may be suitably linear or branched.

In addition, the flowable functional group of $R_6$ and/or $R_7$ in Formula 5 may be the same as the flowable functional group described above.

The effect of the present application can be maximized by allowing the thiophene-based polymer of the present application to simultaneously include the polymerization unit of Formula 4 and the polymerization unit of Formula 5 as above, which are included in the ratio to be described below.

In one example, the ratio (M4/M5) of the mole number (M4) of the polymerization unit of Formula 4 to the mole number (M5) of the polymerization unit of Formula 5 may be in the range of approximately 0.1 to 10. In another example, the ratio (M4/M5) may be approximately 0.2 or more, approximately 0.3 or more, or approximately 0.4 or more, or may be approximately 9.5 or less, approximately 9.0 or less, approximately 8.5 or less, approximately 8.0 or less, approximately 7.5 or less, approximately 7.0 or less, approximately 6.5 or less, approximately 6.0 or less, approximately 5.5 or less, approximately 5.0 or less, approximately 4.5 or less, approximately 4.0 or less, approximately 3.5 or less, approximately 3.0 or less, or approximately 2.5 or less.

In the present application, by controlling the ratio (M4/M5) to be within the range as above, the thiophene-based monomer mixture, the thiophene-based polymer composition, or the like has appropriate dispersibility and fluidity therein, whereby the polymerization of the thiophene-based polymer and/or the formation of the conductive polymer layer may be effectively achieved, and simultaneously the thiophene-based polymer may have excellent adhesion force to the active material core. Accordingly, it is possible to provide an electrode active material or the like having excellent conductivity as well as excellent mechanical flexibility, while preventing side reactions between the active material core and an electrolyte from occurring. The polymerization unit of Formula 3 or the polymerization unit of Formula 4 and the polymerization unit of Formula 5 may be polymerized in a manner to be described below to form a thiophene-based polymer.

In the present application, the thiophene-based polymer may have a weight average molecular weight (Mw) in a range of, for example, approximately 500 g/mol to 100,000 g/mol. By controlling the weight average molecular weight (Mw) of the thiophene-based polymer within the above range, it is possible to secure the desired conductivity, dispersibility, and fluidity in the thiophene-based polymer composition. In another example, the weight average molecular weight of the thiophene-based polymer may be approximately 1000 g/mol or more, approximately 1500 g/mol or more, approximately 2000 g/mol or more, approximately 2500 g/mol or more, approximately 3000 g/mol or more, approximately 3500 g/mol or more, approximately 4000 g/mol or more, approximately 4500 g/mol or more, approximately 5000 g/mol or more, or approximately 5500 g/mol or more, or may be approximately 90000 g/mol or less, approximately 80000 g/mol or less, approximately 70000 g/mol or less, approximately 60000 g/mol or less, approximately 50000 g/mol or less, approximately 40000 g/mol or less, approximately 30000 g/mol or less, approximately 25000 g/mol or less, approximately 20000 g/mol or less, or approximately 15000 g/mol or less, but is not limited thereto. The weight average molecular weight may be evaluated in the manner described in Evaluation Example 7 below.

The thiophene-based polymer of the present application has the polymerization unit of Formula 3, Formula 4 and/or Formula 5 comprising the above-described structure, for example, the propylenedioxy structure, and the like, whereby for example, the oxidation potential may be in the range of approximately 2.0V to 4.2V. Accordingly, the thiophene-based polymer of the present application may be self-doped through charging/discharging of the battery, and the like. The thiophene-based polymer of the present application may be a conjugated polymer, as described above, and by having such a conjugated structure, it may have conductive properties by delocalization of π-electron density. However, the thiophene-based polymer without doping, and the like, may exhibit a large sheet resistance of, for example, $10^5$ Ω/$cm^2$, and accordingly, since the conductivity may be low, it may be necessary to control the conduction properties of the thiophene-based polymer through the doping process. In the present application, the doping may be, for example, self-doping. In this specification, the self-doping may occur, for example, in a range in which a battery voltage in the charging/discharging process of the battery is higher than the oxidation potential of the thiophene-based polymer. In one example, the voltage of the battery in the charging/discharging process of the battery may be in the range of approximately 2.5V to 4.3V, where the thiophene-based polymer may be oxidized at a voltage state of being higher than the oxidation potential of the thiophene-based polymer. Accordingly, the sheet resistance may be lowered, for example, within a range of 102 Ω/$cm^2$ to 103 Ω/$cm^2$, and thus the thiophene-based polymer of the present application may exhibit excellent conductivity.

In another example, the oxidation potential of the thiophene-based polymer may be approximately 2.1V or more, approximately 2.2V or more, approximately 2.3V or more, approximately 2.4V or more, or approximately 2.5V or more, or may be approximately 4.1V or less, approximately 4.0V or less, approximately 3.9 V or less, approximately 3.8V or less, approximately 3.7V or less, approximately 3.6V or less, approximately 3.5V or less, approximately 3.4V or less, approximately 3.3V or less, or approximately 3.2V or less. The oxidation potential may be measured in a known manner.

By comprising the thiophene-based polymer as above, the conductive polymer layer of the present application can appropriately control side reactions with the electrolyte or the like while exhibiting excellent conductive properties. Such an effect can be further maximized by setting the thickness of the conductive polymer layer, the weight ratio of the coverage and/or the active material core, and the like in the range to be described below.

The coverage of the conductive polymer layer of the present application to the active material core may be, for example, about 80% or more. In this specification, the coverage may mean, for example, a percentage ((D/C)×100) of the area (D) of the portion where the conductive polymer layer is formed on the surface of the active material core to the surface area (C) of the active material core. In this specification, the formation of the conductive polymer layer may mean, for example, a case where the thickness of the conductive polymer layer is approximately 1 nm or more. That is, in this specification, the coverage of the conductive polymer layer to the active material core may mean, for example, the percentage ((D/C)×100) of the area (D) of the portion where the conductive polymer layer is formed to be approximately 1 nm or more on the surface of the active material core to the surface area (C) of the active material core. In another example, the coverage may be approximately 81% or more, approximately 82% or more, approximately 83% or more, approximately 84% or more, approximately 85% or more, approximately 86% or more, approximately 87% or more, approximately 88% or more, approximately 90% or more, approximately 91% or more, approximately 92% or more, approximately 93% or more, approximately 94% or more, approximately 95% or more, approximately 96% or more, approximately 97% or more, approximately 98% or more, or approximately 99% or more. The upper limit is not particularly limited because the greater the coverage, the better it may be in terms that the active material core exhibits excellent conductivity without exhibiting side reactions with an electrolyte, and the like, but in one example, it may be approximately 100% or less, approximately 99% or less, approximately 98% or less, approximately 97% or less, approximately 96% or less, approximately 95% or less, approximately 94% or less, approximately 93% or less, approximately 92% or less, approximately 91% or less, approximately 90% or less, approximately 89% or less, approximately 88% or less, approximately 87% or less, or approximately 86% or less, but is not limited thereto. The coverage may be measured, for example, as in the method of Evaluation Example 5 as described below.

The conductive polymer layer of the present application may have a thickness, for example, in a range of approximately 1 nm to 1 μm. By controlling the thickness of the conductive polymer layer in the above range, it is possible to exhibit excellent conductivity while protecting the active material core from side reactions with the electrolyte and preventing the ion flow between the active material core and the electrolyte and the like from being disturbed. In another example, the thickness of the conductive polymer layer may be approximately 1.5 nm or more, 2.0 nm or more, 2.5 nm or more, 3.0 nm or more, 3.5 nm or more, 4.0 nm or more, 4.5 nm or more, 5.0 nm or more, 5.5 nm or more, or 6.0 nm or more, or may be 900 nm or less, 800 nm or less, 700 nm or less, 600 nm or less, 500 nm or less, 400 nm or less, 300 nm or less, 200 nm or less, 100 nm or less, 90 nm or less, 80 nm or less, 70 nm or less, 60 nm or less, 50 nm or less, 40 nm or less, 30 nm or less, 20 nm or less, 19 nm or less, 18 nm or less, 17 nm or less, 16 nm or less, 15 nm or less, 14 nm or less, 13 nm or less, 12 nm or less, 11 nm or less, 10 nm or less, or 9 nm or less, but is not limited thereto. The thickness of the conductive polymer layer may be measured, for example, as in the method of Evaluation Example 5 as described below.

The weight ratio of the conductive polymer layer of the present application may be, for example, in the range of approximately 0.1 to 150 parts by weight relative to 100 parts by weight of the active material core. In another example, the conductive polymer layer may be approximately 1 part by weight or more, approximately 2 parts by weight or more, approximately 3 parts by weight or more, approximately 4 parts by weight or more, approximately 5 parts by weight or more, approximately 6 parts by weight or more, approximately 7 parts by weight or more, approximately 8 parts by weight or more, or approximately 9 parts by weight or more, or may be approximately 145 parts by weight or less, approximately 140 parts by weight or less, approximately 135 parts by weight or less, approximately 130 parts by weight or less, approximately 125 parts by weight or less, approximately 120 parts by weight or less, approximately 115 parts by weight or less, approximately 110 parts by weight or less, or approximately 105 parts by weight or less, relative to 100 parts by weight of the active material core, but is not limited thereto. Here, the weight ratio of the conductive polymer layer to the active material core can be measured using, for example, a TGA (thermogravimetric analysis), which can be calculated through the ratio of the mass after the electrode active material is heated from room temperature to approximately 800° C. or so to the initial mass of the electrode active material.

The present application can provide an electrode active material having excellent electrical conductivity and ionic conductivity as well as excellent mechanical flexibility, while preventing side reactions between the active material core and an electrolyte from occurring by forming a unique conductive polymer layer on the active material core to exhibit the coverage, thickness and/or weight ratio, and the like as above.

In one example, the electrode active material of the present application may have excellent elution properties by appropriately forming the conductive polymer layer having the above-described features on the active material core. In this specification, the excellent elution properties may mean, for example, that the elution amount of the main element of the active material core, for example, nickel (Ni), is 400 ppm or less even after the electrode active material is added to the electrolyte and stirred for about 4 weeks. In another example, the elution amount of the nickel (Ni) may be 350 ppm or less, 300 ppm or less, 250 ppm or less, 200 ppm or less, or 150 ppm or less, and because it may mean that the less the elution amount, the more effectively controlled the side reactions between the active material core and the electrolyte, and the like are. The lower limit of the elution amount is not particularly limited, which may be, for example, 1 ppm or more, 10 ppm or more, or 15 ppm or more. The elution properties may be evaluated, for example, in the manner of Evaluation Example 1 described below.

In one example, the electrode active material of the present application may have an excellent rolling density. In this specification, the excellent rolling density may mean, for example, that the rolling density is approximately 3.00 g/cc or more. In particular, the electrode active material of the present application may have excellent mechanical flexibility by comprising the conductive polymer layer having the above-described features. In another example, the rolling density may be approximately 3.01 g/cc or more, approximately 3.02 g/cc or more, approximately 3.03 g/cc or more, approximately 3.04 g/cc or more, approximately 3.05 g/cc or more, approximately 3.06 g/cc or more, or approximately 3.07 g/cc or more, and because the higher the rolling density, the better the energy density and the like, the upper limit of the rolling density is not particularly limited, but it may be, for example, approximately 10 g/cc or less, 9 g/cc or less, 8 g/cc or less, 7 g/cc or less, 6 g/cc or less, 5 g/cc or less, or 4 g/cc or less. The rolling density may be evaluated, for example, in the manner of Evaluation Example 2 described below.

The present application may also relate to a method of manufacturing an electrode active material.

The method of manufacturing an electrode active material of the present application may comprise, for example, a step of mixing a thiophene-based polymer with an active material core. Here, with respect to the active material core and/or the thiophene-based polymer, the foregoing disclosure may be equally applicable. The mixing step may comprise, for example, a step of dispersing the thiophene-based polymer in an organic solvent to prepare a dispersion and/or a step of introducing the active material core to the dispersion. Here, the organic solvent may be, for example, N-methylpyrrolidone (NMP), dimethyl sulfoxide (DMSO), isopropyl alcohol, acetone, chloroform, dichloromethane, ethyl acetate or water, and the like, where one or a mixture of two or more of the foregoing may be used. In particular, the thiophene-based polymer of the present application may have excellent dispersibility in an organic solvent in the mixing step by containing the above-described functional group in a predetermined range, and accordingly, may be uniformly formed with excellent coverage on the surface of the active material core.

In the step of mixing the thiophene-based polymer with the active material core, the thiophene-based polymer may be included, for example, in a range of approximately 0.005 parts by weight to 10 parts by weight relative to 100 parts by weight of the active material core. In another example, the thiophene-based polymer may be included in an amount of approximately 0.006 parts by weight or more, approximately 0.007 parts by weight or more, approximately 0.008 parts by weight or more, or approximately 0.009 parts by weight or more, or in an amount of approximately 9 parts by weight or less, approximately 8 parts by weight or less, approximately 7 parts by weight or less, approximately 6 parts by weight or less, approximately 5 parts by weight or less, approximately 4 parts by weight or less, approximately 3 parts by weight or less, approximately 2 parts by weight or less, approximately 1 part by weight or less, approximately 0.5 parts by weight or less, approximately 0.1 parts by weight or less, approximately 0.09 parts by weight or less, approximately 0.08 parts by weight or less, approximately 0.07 parts by weight or less, approximately 0.06 parts by weight or less, approximately 0.05 parts by weight or less, approximately 0.04 parts by weight or less, approximately 0.03 parts by weight or less, or approximately 0.02 parts by weight or less, relative to 100 parts by weight of the active material core.

The mixing step may further comprise, for example, a stirring step and/or a drying step, and the like. It may be appropriate in terms of the coverage, uniformity, and the like of the conductive polymer layer to the active material core that the stirring step is performed, for example, at a temperature in a range of approximately 10° C. to 80° C. for a time in a range of 0.1 hours to 12 hours, without being limited thereto. It may be appropriate for removal of the residual solvent that the drying step is performed, for example, at a temperature in a range of approximately 60° C. to 100° C. for a time in a range of approximately 1 hour to 24 hours, without being limited thereto. The stirring and/or drying step may be appropriately adjusted in consideration of the desired thickness, coverage, and the like of the conductive polymer layer.

The method of manufacturing an electrode active material of the present application may also comprise, for example, a step of polymerizing a thiophene-based monomer to form a thiophene-based polymer. The method of polymerizing a thiophene-based monomer may include methods such as oxidative polymerization, electropolymerization, solid phase polymerization, gas phase polymerization, solution casting polymerization, or aqueous emulsion polymerization, where an appropriate polymerization method may be selected in consideration of the intended use, conductivity, and the like.

The thiophene-based polymer of the present application may be formed through an oxidative polymerization method. In one example, the method of manufacturing an electrode active material may comprise, for example, a step of polymerizing thiophene-based monomers having one or more functional groups selected from the group consisting of a carboxyl group, a hydroxyl group, an amine group, a nitro group, an ether group, a carbonyl group and/or a flowable functional group in the presence of an oxidizing agent. The polymerization method may comprise, for example, a step of polymerizing the thiophene-based monomer of the present application on an organic solvent using an excess of an oxidizing agent. Here, the organic solvent may be used in consideration of the solubility of the thiophene-based monomer, and the like, which may be, for example, methylene chloride, chloroform, tetrahydrofuran, or acetonitrile, and the like. Here, the oxidizing agent may be, for example, an oxide of a metal containing iron salt (III), iron salt (II) or copper (II) chloride, and may be, specifically, $FeCl_3$, $CuCl_2$, $FeCl_3/H_2O_2$, $FeCl_3/O_2$, $FeCl_3/HMnO_4$, $FeCl_2/F_2$, $FeCl_2/H_2O_2$, $FeCl_2/HMnO_4$, $FeCl_2/F_2$, $CuCl_2/H_2O_2$ or $CuCl_2/HMnO_4$. The oxidizing agent may be included, for example, in a content of 10 to 500 parts by weight relative to 100 parts by weight of the thiophene-based monomer. In another example, the content of the oxidizing agent may be 20 parts by weight or more, 30 parts by weight or more, 40 parts by weight or more, 50 parts by weight or more, or 60 parts by weight or more, or may be 450 parts by weight or less, 400 parts by weight or less, 350 parts by weight or less, 300 parts by weight or less, or 250 parts by weight or less, relative to 100 parts by weight of the thiophene-based monomer. By controlling the content of the oxidizing agent in the above range, the polymerization of the thiophene-based monomer can be easily performed. The oxidative polymerization may further comprise, for example, a step of removing unreacted residues, and the like, a washing or drying step, and the like.

The thiophene-based monomer may be the same monomer as described above. The method of manufacturing an electrode active material of the present application may be, for example, using a thiophene-based monomer represented by Formula 6 below.

[Formula 6]

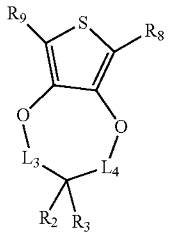

In Formula 6, $L_3$ and $L_4$ may each independently be a single bond or an alkylene group, $R_2$ may be a carboxyl group, a hydroxyl group, an amine group, a nitro group, an ether group, a carbonyl group, or a flowable functional group, $R_3$ may be hydrogen or a carboxyl group, a hydroxyl group, an amine group, a nitro group, an ether group, a carbonyl group, or a flowable functional group, and $R_8$ and $R_9$ may each independently be hydrogen or halogen.

$R_2$ and/or $R_3$ of Formula 6 may be the same or different. The detailed description of the flowable functional group of $R_2$ and/or $R_3$ in Formula 6 may be the same as described above.

In one example, the alkylene group of $L_3$ and/or $L_4$ in Formula 6 may each independently be an alkylene group with 1 to 20 carbon atoms, 1 to 16 carbon atoms, 1 to 12 carbon atoms, 1 to 8 carbon atoms, or 1 to 4 carbon atoms. The alkylene group may be linear, branched or cyclic, and may be suitably linear or branched.

The role of each of the carboxyl group, hydroxyl group, amine group, nitro group, ether group, carbonyl group and/or flowable functional group in Formula 6 may be the same as described above. In the present application, $R_2$ and/or $R_3$ may be appropriately selected in consideration of the above-described roles, effects, and the like.

$R_8$ and $R_9$ of Formula 6 may each independently be hydrogen or halogen.

The present application can provide an electrode active material having excellent electrical conductivity and ionic conductivity as well as excellent mechanical flexibility, while preventing side reactions between the active material core and an electrolyte from occurring by using the thiophene-based monomer represented by Formula 6 above to polymerize a thiophene-based polymer, and forming a conductive polymer layer comprising the thiophene-based polymer on the surface of the active material core.

The present application may also relate to, for example, an electrode comprising a current collector and an electrode active material layer formed on one side of the current collector.

In the present application, the current collector is not particularly limited as long as it has conductivity without causing a chemical change in the battery, and for example, aluminum, copper, stainless steel, nickel, titanium, backed carbon, or those, and the like obtained by surface-treating the surface of aluminum or stainless steel with carbon, nickel, titanium, silver, or the like may be used.

The current collector may typically have a thickness of 3 to 500 μm and may also increase adhesion force between the electrode active material layer and the like by forming fine irregularities on the surface of the current collector. The current collector may be used, for example, in various forms of a film, a sheet, a foil, a net, a porous body, a foam, a nonwoven body, and the like.

The electrode active material layer may comprise, for example, an electrode active material, a conductive material and/or a binder.

The conductive material is used to impart conductivity to the electrode, where it can be used without any particular limitation as long as it has electronic conductivity without causing a chemical change in the electrode active material. In the present application, the conductive material may be, for example, graphite such as natural graphite or artificial graphite; carbon-based substances such as carbon black, acetylene black, Ketjen black, Denka black, Timrex, Channel black, Furnace black, Lamp black, Summer black, and carbon fiber; metal powders or metal fibers such as copper, nickel, aluminum, and silver; conductive whiskers such as zinc oxide and potassium titanate; conductive metal oxides such as titanium oxide; or a conductive polymer such as a polyphenylene derivative, and the like, and one or a mixture of two or more of the foregoing may be used.

The conductive material may be included, for example, in a range of approximately 0.005 to 5 parts by weight relative to 100 parts by weight of the electrode active material. By comprising the conductive material in the parts by weight as above, the present application can provide a method of manufacturing an electrode active material which can impart sufficient conductivity to the electrode or the like, and can accordingly suppress the increase of the battery resistance by forming conductive paths connected to the current collector and the like at a desired level, while it can implement a battery having an excellent capacity. In another example, the conductive material may be included in an amount of approximately 0.006 parts by weight or more, approximately 0.007 parts by weight or more, approximately 0.008 parts by weight or more, approximately 0.009 parts by weight or more, approximately 0.010 parts by weight or more, approximately 0.011 parts by weight or more, approximately 0.012 parts by weight or more, or approximately 0.013 parts by weight or more, or in an amount of approximately 4.5 parts by weight or less, approximately 4 parts by weight or less, approximately 3.5 parts by weight or less, approximately 3 parts by weight or less, approximately 2.5 parts by weight or less, approximately 2 parts by weight or less, or approximately 1.5 parts by weight or less, relative to 100 parts by weight of the electrode active material.

The binder may be used without particular limitation as long as it serves to improve attachment between the electrode active material particles and/or adhesion force between the electrode active material and the current collector. In the present application, the binder may be, for example, polyvinylidene fluoride (PVDF), vinylidene fluoride-hexfluoropropylene copolymer (PVDF-co-HFP), polyvinyl alcohol (PVA), polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber (SBR), fluororubber, or various copolymers thereof, and the like, and one or a mixture of two or more of the foregoing may be used.

The binder may be included, for example, in a range of approximately 0.005 to 5 parts by weight relative to 100 parts by weight of the electrode active material. The present application can secure adhesion force between the electrode active material and the electrode current collector at a desired level by comprising the binder in the parts by weight as above. In another example, the binder may be included in an amount of approximately 0.006 parts by weight or more, approximately 0.007 parts by weight or more, approximately 0.008 parts by weight or more, approximately 0.009 parts by weight or more, approximately 0.010 parts by weight or more, approximately 0.011 parts by weight or more, approximately 0.012 parts by weight or more, or approximately 0.013 parts by weight or more, or in an amount of approximately 4.5 parts by weight or less, approximately 4 parts by weight or less, approximately 3.5 parts by weight or less, approximately 3 parts by weight or less, approximately 2.5 parts by weight or less, approximately 2 parts by weight or less, or approximately 1.5 parts by weight or less, relative to 100 parts by weight of the electrode active material.

The electrode active material layer of the present application may be manufactured according to a conventional electrode manufacturing method. The electrode active material layer may be manufactured through, for example, a step of applying a composition for forming an electrode active material comprising a solvent to be described below together with an electrode active material, a conductive material and/or a binder on the current collector, followed by drying and/or rolling. Here, the contents of each of the electrode active material, the conductive material and/or the binder may be the same as those described above.

The solvent is a solvent commonly used in the relevant technical field, which may be, for example, N-methylpyrrolidone (NMP), dimethyl sulfoxide (DMSO), isopropyl alcohol (isopropyl alcohol), acetone or water, and the like, and one or a mixture of two or more of the forgoing may be used. As long as the amount of the solvent used is to the extent that the conductive material and/or the binder are dissolved or dispersed in consideration of the coating thickness of the electrode active material layer, the production yield, and the like to have a viscosity capable of exhibiting excellent thickness uniformity upon application for subsequent electrode production, it is not particularly limited.

After applying the composition for forming an electrode active material on the current collector, the electrode active material layer may be formed on the current collector through a drying process.

The application process may mean, for example, a process of applying the composition for forming an electrode active material on the current collector in a predetermined pattern and/or a constant thickness through a coating head while supplying the current collector with appropriate tension, and the drying process may mean a process of removing a solvent and/or moisture, and the like included in the electrode active material composition applied on the current collector. In the present application, the drying process may be performed under conditions commonly applied in the relevant field. The drying process may be performed, for example, at a temperature of less than 130° C., but is not limited thereto, which may be adjusted according to the purpose, and the like.

The present application may further comprise a density (thickness) measuring process, and the like, in addition to the step of forming the electrode active material layer on the current collector, where the density (thickness) measuring process may be a process for confirming whether the composition has been applied as a desired amount.

In consideration of the desired porosity of the electrode active material layer or the capacity of the battery to be implemented, and the like, the rolling step may be performed while adjusting the loading amount of the composition for forming an electrode active material and/or the thickness (e.g., pressing gap) after rolling, and the like. The porosity of the electrode active material layer after the rolling process is performed may be approximately 35% or less or so in terms of securing energy density or adhesion between the current collector and the electrode active material layer, and the like, and in another example, it may be approximately 29% or less or so, approximately 28% or less or so, approximately 27% or less or so, or approximately 26% or less or so, and may be approximately 5% or more or so, approximately 10% or more or so, approximately 15% or more or so, or approximately 20% or more or so in consideration of aspects such as control of breakage of the current collector.

The present application may also relate to an electrochemical element comprising the electrode. The electrochemical element may be, for example, a battery or a capacitor, and the like, and more specifically, it may be a lithium secondary battery.

In the present application, the lithium secondary battery may comprise, for example, a positive electrode, a negative electrode positioned to face the positive electrode, a separator and/or an electrolyte interposed between the positive electrode and the negative electrode, and the like, where the above-described electrode may be included or used as the positive electrode. In addition, the lithium secondary battery may further comprise a battery container for accommodating the electrode assembly of the positive electrode, the negative electrode, the separator, and the like and/or a sealing member for sealing the battery container, and the like.

In the present application, the negative electrode may comprise, for example, a negative electrode current collector and a negative electrode active material layer formed on the negative electrode current collector.

The negative electrode current collector is not particularly limited as long as it has high conductivity without causing a chemical change in the battery, which may be, for example, copper, stainless steel, aluminum, nickel, titanium, baked carbon, those that the surface of copper or stainless steel is surface-treated with carbon, nickel, titanium, silver, or the like, an aluminum-cadmium alloy, and the like.

The negative electrode current collector may typically have a thickness of 3 μm to 500 μm, and similarly to the above-described current collector, the binding force with the negative electrode active material or the like may also be strengthened by forming fine irregularities on the surface of the current collector. The negative electrode current collector may be used in various forms of, for example, a film, a sheet, a foil, a net, a porous body, a foam, a non-woven body, and the like.

The negative electrode active material layer may optionally comprise a binder and/or a conductive material together with the negative electrode active material.

As the negative electrode active material, a material having a low standard electrode potential, little structural change due to a reaction with lithium ions, and excellent reaction reversibility with lithium ions while being capable of reversible insertion and desorption of lithium may be preferably used, which may be, for example, carbonaceous materials such as artificial graphite, natural graphite, graphitized carbon fiber, and amorphous carbon; metallic compounds capable of alloying with lithium, such as Si, Al, Sn, Pb, Zn, Bi, In, Mg, Ga, Cd, Si alloy, Sn alloy, or Al alloy; metal oxides capable of doping and de-doping lithium, such as $SiO_\beta$ ($0<\beta<2$), $SnO_2$, vanadium oxide, and lithium vanadium oxide; or a composite comprising the metallic compound and the carbonaceous material, such as a Si—C composite or a Sn—C composite, and the like, where any one or a mixture of two or more thereof may be used. Also, in another example, as the negative electrode active material, a lithium metal thin film; carbon materials such as low crystalline carbon and high crystalline carbon, and the like may be used, where the low crystalline carbon may be exemplified by amorphous, plate-like, scale-like, spherical or fiber-type natural or artificial graphite, Kish graphite, pyrolytic carbon, mesophase pitch based carbon fiber, mesocarbon microbeads, high-temperature baked carbon such as mesophase pitches and petroleum or coal tar pitch derived cokes, and the like.

As the binder and/or the conductive material, which may be introduced into the electrode active material layer, the binder and/or the conductive material as described above may be equally applied.

In the lithium secondary battery of the present application, the separator is a microporous polymer film having pores with a size of several nm to several μm, which may separate the negative electrode and the positive electrode and provide passages for lithium ions. The separator can be used without any particular limitation as long as it is usually used as a separator in a lithium secondary battery, and in particular, it is preferable that the separator has low resistance to ion movement of the electrolyte as well as excellent electrolyte moisture content capability. The separator may be, for example, a porous polymer film made of a polyolefin-based polymer such as ethylene homopolymer, propylene homopolymer, ethylene/butene copolymer, ethylene/hexene copolymer, and ethylene/methacrylate copolymer, or a laminated structure of two layers thereof, and the like, or may be a conventional porous nonwoven fabric made of high-melting glass fiber, polyethylene terephthalate fiber, and the like, and in another example, a coating separator comprising a ceramic component or a polymer material may also be used to secure heat resistance or mechanical strength. The thickness of the separator may be, for example, in a range of 1 μm to 100 μm. In another example, the thickness of the separator may be 2 μm or more, 3 μm or more, 4 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, 16 μm or more, 17 μm or more, 18 μm or more, or 19 μm or more, or may be 90 μm or less, 80 μm or less, 70 μm or less, 60 μm or less, 50 μm or less, 40 μm or less, or 30 μm or less.

In the present application, the electrolyte may be, for example, an organic liquid electrolyte, an inorganic liquid electrolyte, a solid polymer electrolyte, a gel polymer electrolyte, a solid inorganic electrolyte, a molten inorganic electrolyte, and the like that can be used upon manufacturing a lithium secondary battery, but is not limited thereto.

The electrolyte may comprise, for example, an organic solvent and/or a lithium salt. The organic solvent may be used without any particular limitation as long as it can serve as a medium through which ions involved in the electrochemical reaction of the battery can move. Specifically, as the organic solvent, ester-based solvents such as methyl acetate, ethyl acetate, γ-butyrolactone, or ε-caprolactone; ether-based solvents such as dibutyl ether or tetrahydrofuran; ketone solvents such as cyclohexanone; aromatic hydrocarbon-based solvents such as benzene or fluorobenzene; carbonate-based solvents such as dimethylcarbonate (DMC), diethylcarbonate (DEC), methylethylcarbonate (MEC), ethylmethylcarbonate (EMC), ethylene carbonate (EC), or propylene carbonate (PC); alcohol-based solvents such as ethyl alcohol or isopropyl alcohol; nitriles such as R—CN (R is a C2-C20 linear, branched or cyclic hydrocarbon group, which may contain a double bond aromatic ring or an ether bond); amides such as dimethylformamide; dioxolanes such as 1,3-dioxolane; or sulfolanes, and the like may be used. Among them, a carbonate-based solvent is preferable as the electrolyte, and a mixture of a cyclic carbonate (e.g., ethylene carbonate or propylene carbonate, etc.) having high ionic conductivity and high dielectric constant capable of increasing the charging/discharging performance of a battery and a low-viscosity linear carbonate-based compound (e.g., ethylmethyl carbonate, dimethyl carbonate, or diethyl carbonate, etc.) is more preferable. In this case, it may be preferable in terms of performance of the electrolyte that the cyclic carbonate and the chain carbonate are mixed in a volume ratio of about 1:1 to about 1:9 and used.

The lithium salt may be used without particular limitation as long as it is a compound capable of providing lithium ions used in a lithium secondary battery. The lithium salt may be, for example, $LiPF_6$, $LiClO_4$, $LiAsF_6$, $LiBF_4$, $LiSbF_6$, $LiAlO_4$, $LiAlC_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI or $LiB(C_2O_4)_2$, and the like. The concentration of the lithium salt may be preferably used within the range of 0.1 to 2.0 M. When the concentration of the lithium salt is within the above range, the electrolyte may exhibit excellent electrolyte performance by having appropriate conductivity and/or viscosity, and the like, and the movement of lithium ions may be effective.

In addition to the above components, the electrolyte may also further comprise, for example, one or more additives of haloalkylene carbonate-based compounds such as difluoroethylene carbonate, pyridine, triethylphosphite, triethanolamine, cyclic ether, ethylene diamine, n-glyme, hexaphosphoric acid triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol, or aluminum trichloride, and the like for the purpose of improving battery life characteristics, suppressing battery capacity reduction, improving battery discharge capacity, and the like. In this case, the additive may be included in a range of approximately 0.1 to 5 weight % relative to the total weight of the electrolyte.

As described above, the lithium secondary battery comprising the electrode active material and/or electrode according to the present invention may also have excellent capacity retention ratios (lifetime characteristics) according to charging/discharging while having a high energy density.

In one example, the lithium secondary battery may have, for example, an initial capacity of approximately 150 mAh/g or more. In particular, the present application can provide a lithium secondary battery capable of maintaining excellent capacity even when the battery is used for a long period of time while having a large initial capacity by forming a unique conductive polymer layer on the surface of the active material core as described above. The initial capacity may be measured, for example, in the same manner as in Evaluation Example 3 below.

In one example, the lithium secondary battery may have, for example, a capacity retention (cycle retention) rate of about 30% or more. In particular, the lithium secondary battery of the present application prevents side reactions between the active material core and the electrolyte, as the electrode active material comprises the conductive polymer layer including the above-described unique thiophene-based polymer, whereby it is possible to secure the excellent capacity retention ratio as above. In this specification, the capacity retention ratio may mean, for example, a value obtained by dividing the measured value of a battery capacity after charging/discharging 30 times, wherein it is repeated 30 times that the battery is charged at 1.0 C in a CC (constant current)/CV (constant voltage) method so that the final charging voltage becomes 4.3V at 45° C., and then discharged at 1.0 C in a CC (constant current) method so that the final discharging voltage becomes 2.5V (1.0 C/1.0 C), through the discharging time during the last discharging by the initial capacity. In another example, the capacity retention ratio may be approximately 35% or more, approximately 40% or more, approximately 45% or more, approximately 50% or more, or approximately 55% or more, and the higher the capacity retention ratio, it means that the better the battery life or the like is, so that the upper limit is not particularly limited, but may be, for example, approximately 100% or less, or approximately 95% or less.

Since the lithium secondary battery of the present application exhibits excellent power characteristics, capacity retention ratio, excellent discharge capacity and/or excellent high-temperature storage stability, and the like, it may be useful in portable devices such as mobile phones, notebook computers and digital cameras, and electric vehicle fields such as hybrid electric vehicles (HEVs) and electric vehicles (EVs). In addition, the present invention may also provide a battery module comprising the lithium secondary battery as a unit cell, and a battery pack comprising the same. The battery module or battery pack may be used as a power source for any one or more medium and large-sized devices of power tools; electric vehicles, including electric vehicles (EVs), hybrid electric vehicles and/or plug-in hybrid electric vehicles (PHEVs); or systems for power storage.

Hereinafter, the present application will be described in detail through Examples, but the scope of the present application is not limited by Examples below.

Evaluation Example 1. Evaluation of Elution Properties 10 g of each positive electrode active material of Examples 1 to 6 and Comparative Example 1 was introduced to a lithium salt ($LiPF_6$) 1M electrolyte comprising 100 ppm of water to prepare a dispersion. Subsequently, the prepared dispersion was stirred at room temperature for 4 weeks, and then a certain amount of the dispersion was sampled. After removing the positive electrode active material from the sampled dispersion using a centrifuge (Hanil Science Co., Ltd., Micro 12), the elution amount (ppm) of nickel (Ni) as a main element of the positive electrode active material was measured from the residual solution using an ICP analyzer (PerkinElmer, Avio 500 ICP-OES).

Evaluation Example 2. Rolling Density Evaluation

After inserting 5 g of each positive electrode active material of Examples 1 to 6 and Comparative Example 1 into a cylindrical metal mold (Hantech) having a diameter of 20 mm, a pressure of 2000 gf was applied to the positive electrode active material using a rolling density meter (Hantech, HPRM-1000) to obtain a pellet. Thereafter, the density of the pellet was calculated by measuring the height of the pellet in the metal mold.

Evaluation Example 3. Initial Capacity Evaluation

The initial capacity of each battery of Examples 7 to 12 and Comparative Example 2 having a reference capacity of 170 mAh/g was evaluated at 25° C. After performing the charging at a rate of 0.1 C in a CC (constant current)/CV (constant voltage) method by setting the final charge voltage to 4.3V and setting the final charge current to 0.2 mA, the initial capacity was calculated from the amount discharged until the discharging was stopped while performing the discharging at a rate of 0.1 C in a CC (constant current) method by setting the final discharge voltage to 2.5V.

Evaluation Example 4. Capacity Retention Ratio (Cycle Retention) Evaluation

After measuring the capacity after performing the charging/discharging 30 times at 25° C. for each battery of Examples 7 to 12 and Comparative Example 2 with a reference capacity of 170 mAh/g, the ratio to the initial capacity measured by Evaluation Example 3 above was calculated. At this time, the charging/discharging 30 times meant that a process (1 cycle) of performing the charging at a rate of 0.33 C in a CC (constant current)/CV (constant voltage) method by setting the final charge voltage to 4.3V and setting the final charge current to 0.2 mA, and then performing the discharging at a rate of 0.33 C in a CC (constant current) method by setting the final discharge voltage to 2.5V is repeated 30 times.

Evaluation Example 5. Evaluation of Thickness and Coverage in Conductive Polymer Layer Each positive electrode active material of Examples 1 to 6 was cross-section-treated by an FIB (focused ion-beam) method, thereby evaluating the thickness of the conductive polymer layer by TEM (Hitach, H7650), and the coverage of the conductive polymer layer was evaluated using SEM (Hitachi, IM5000).

Evaluation Example 6. Evaluation of Oxidation Potential in Conductive Polymer A platinum (Pt) electrode coated with a conductive polymer was immersed in a lithium salt ($LiPF_6$) 1M electrolyte, and then the oxidation potential was measured using a potentiometer (Princeton Applied Research, Parstat 2273).

Evaluation Example 7. Molecular Weight Evaluation

The weight average molecular weight (Mw), number average molecular weight (Mn), and molecular weight distribution were measured using GPC (gel permeation chromatography). Each polymeric substance of Examples and the like is placed in a 5 mL vial, and diluted in chloroform to a concentration of about 1 mg/mL or so. Thereafter, the standard sample for calibration and the sample to be analyzed were filtered through a syringe filter (pore size: 0.45 μm) and then the measurement was performed. As the analysis program, Waters' Empower 3 was used, and the weight average molecular weight (Mw) and number average molecular weight (Mn) were obtained by comparing the elution time of the sample with the calibration curve, and the molecular weight distribution (PDI) was calculated from the ratio (Mw/Mn). The measurement conditions of GPC are as follows.

GPC Measurement Conditions

- Instrument: Waters' 2414
- Column: using Waters' 3 Styragel
- Solvent: THF
- Column temperature: 35° C.
- Sample concentration: 1 mg/mL, 1 mL injection
- Standard sample: polystyrene (Mp: 3900000, 723000, 316500, 52200, 31400, 7200, 3940, 485)

Evaluation Example 8. NMR Analysis Method

The $H^1$-NMR analysis was performed at room temperature using an NMR spectrometer (Varian, 500 MHz NMR) including a Bruker UltraShield (300 MHz) spectrometer having a triple resonance 5 mm probe. The analyte was diluted in a solvent ($CDCl_3$) for NMR measurement to a concentration of about 10 mg/ml or so and used, and chemical shifts were expressed in ppm.

Synthesis Example 1

Compound 1 (3,4-[2,2'-bis(bromomethyl)propylenedioxy]thiophene) in Scheme 1 below was synthesized in the following manner.

[Scheme 1]

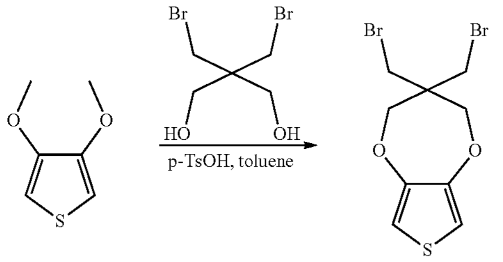

Compound 1

5 g (34.68 mmol, 1 eq) of 3,4-dimethoxythiophene and 10.9 g (41.61 mmol, 1.2 eq) of 2,2-bisbromomethyl-1,3-propanediol were dissolved in 200 ml of toluene together with 500 mg of p-toluenesulfonic acid (p-TsOH). The mixture was refluxed at 120° C., and methanol generated by the reaction (transetherification) of the reactants was removed with a 4A type molecular sieve filled in a Soxhlet extractor. After refluxing for 24 hours, the mixture was quenched with water, extracted with ethyl acetate, and then washed with brine, and the reactant was dried over magnesium sulfate ($MgSO_4$). The solvent was evaporated with a rotary evaporator and the residue was purified by column chromatography eluting with methylene chloride/hexane (1:4). As a result, Compound 1 of Scheme 1 (3,4-(2,2'-bis(bromomethyl)propylenedioxy)thiophene) could be obtained. At this time, it was confirmed through the $H^1$-NMR analysis that Compound 1 of Scheme 1 was prepared, and the analysis result was shown in FIG. 1.

Synthesis Example 2

Compound 2 (3,4-[2,2'-bis(carboxymethyl)propylenedioxy]thiophene) in Scheme 2 below was synthesized in the following manner.

[Scheme 2]

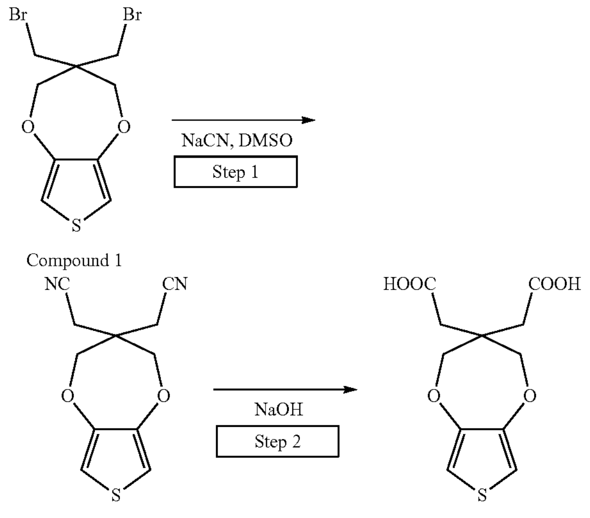

Compound 1

Compound 1a

Compound 2

Step 1

1.20 g (3.51 mmol, 1 eq) of Compound 1 prepared by Synthesis Example 1 and 2.07 g (42.26 mmol, 12 eq) of sodium cyanide were dissolved in 150 ml of dimethyl sulfoxide (hereinafter DMSO), and stirred at room temperature for 10 days. The mixture was quenched with deionized water, dried over magnesium sulfate ($MgSO_4$), and then evaporated under vacuum. The residue was purified by column chromatography eluting with methylene chloride/hexanes (2:1). As a result, Compound 1a of Scheme 2 ([3,4-(2,2'-bis(cyanomethyl)propylenedioxy)thiophene]) could be obtained. At this time, it was confirmed through the $H^1$-NMR analysis that Compound 1a of Scheme 2 was prepared, and the analysis result was shown in FIG. 2.

Step 2

1 g (4.27 mmol, 1 eq) of the prepared Compound 1a was dissolved in a mixed solution of 100 ml of 1M aqueous sodium hydroxide (NaOH) solution and 100 ml of ethylene glycol, and then refluxed at 95° C. for 24 hours. The mixture was cooled to room temperature, and then quenched with 1N hydrochloric acid (HCl), and extracted with diethyl ether. The solution was dried over magnesium sulfate ($MgSO_4$), and then evaporated under vacuum. The residue was precipitated with chloroform to prepare the desired Compound 2 (3,4-[2,2'-bis(carboxymethyl)propylenedioxy]thiophene). It was confirmed through the $H^1$-NMR analysis that Compound 2 above was prepared, and the analysis result was shown in FIG. 3.

Synthesis Example 3

Compound 3 (3,4-[2,2'-bis(hydroxymethyl)propylenedioxy]thiophene) in Scheme 3 below was synthesized in the following manner.

[Scheme 3]

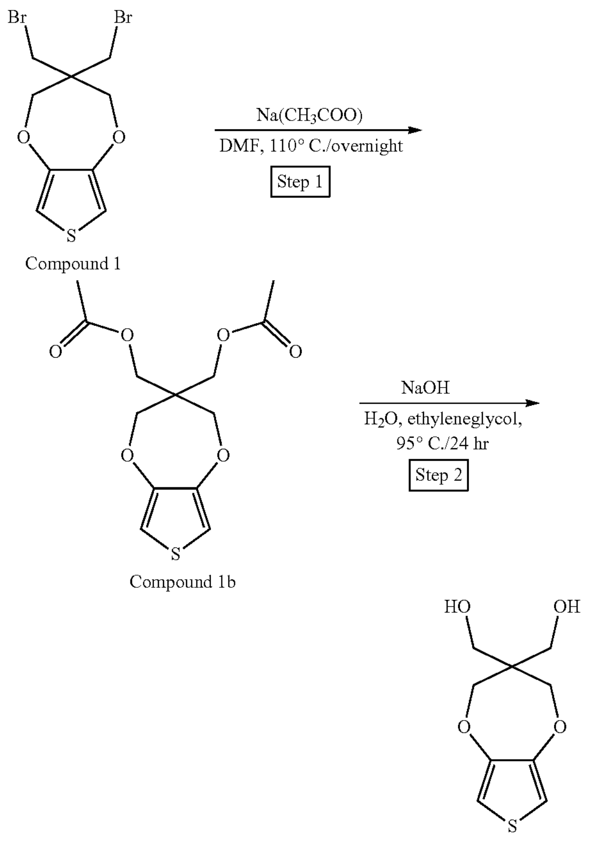

Compound 1

Compound 1b

Compound 3

Step 1

5 g (14.62 mmol, 1 eq) of Compound 1 prepared by Synthesis Example 1 and 12 g (0.146 mmol, 10 eq) of sodium acetate were dissolved in 150 ml of N,N-dimethylformamide (hereinafter DMF), and refluxed overnight at 110° C. The solution was cooled to room temperature, and then the solution was quenched with water, extracted three times with ethyl acetate, and then washed with brine, dried over magnesium sulfate ($MgSO_4$), and then evaporated under vacuum. The residue was purified by column chromatography eluting with ethyl acetate/hexanes (1:2) to obtain Compound 1b of Scheme 3 (3,4-(2,2'-bis(methylethanoate)propylenedioxy)thiophene). It was confirmed through the $H^1$-NMR analysis that Compound 1b above was prepared, and the analysis result was shown in FIG. 4.

Step 2

3 g (9.99 mmol, 1 eq) of the prepared Compound 1b was dissolved in a mixed solution of 15 ml of 2M aqueous sodium hydroxide (NaOH) solution and 15 ml of ethylene glycol, and then stirred at 95° C. for 24 hours. The mixed solution was diluted with 2N sulfuric acid ($H_2SO_4$), extracted with ethyl acetate, and then washed with brine. The residue was dried over magnesium sulfate ($MgSO_4$), and then purified by chloroform precipitation to prepare the desired Compound 3 (3,4-[2,2'-bis(hydroxymethyl)propylenedioxy]thiophene). It was confirmed through the $H^1$-NMR analysis that Compound 3 above was prepared, and the analysis result was shown in FIG. 5.

Synthesis Example 4

Compound 4 (3,4-(2,2'-bis[2-(2-(2-(2-methoxyethoxy)ethoxy)ethoxy)ethoxy)methyl] propylenedioxy)thiophene) in Scheme 4 below was synthesized in the following manner.

[Scheme 4]

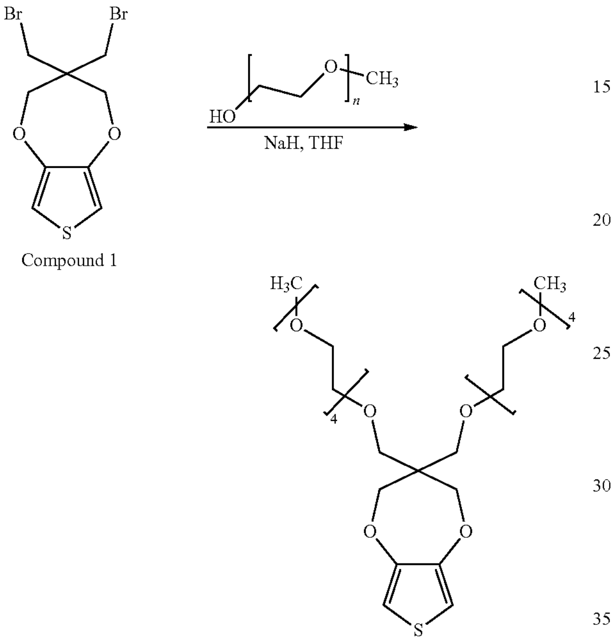

Compound 1

Compound 4

0.561 g of sodium hydride (NaH) (60% with oil, 14.03 mmol, 6 eq) and 62 mg of 18-crown-6-ether (0.234 mmol, 0.1 eq) were dispersed in 15 ml of tetrahydrofurane (THF) under an argon atmosphere. After the dispersion was cooled to 0° C., 0.8 g (2.34 mmol, 1 eq) of Compound 1 prepared in Synthesis Example 1 above was injected thereto, and then stirred at room temperature for 1 hour. After the mixed solution was cooled to 0° C. again, 1.461 g (7.017 mmol, 3 eq) of tetraethylene glycol monomethyl ether was injected thereto and stirred at room temperature for 3 hours, and then heated to 80° C. and further stirred for 24 hours, and then cooled to room temperature, and quenched with 1N hydrochloric acid (HCl). The quenched mixed solution was extracted with diethyl ether, and then washed with 1N hydrochloric acid (HCl), and the reactant was dried over magnesium sulfate ($MgSO_4$). The solvent was evaporated with a rotary evaporator, and the residue was purified by column chromatography eluting with methylene chloride/hexanes (1:2) to prepare the desired Compound 4 (3,4-(2,2'-bis[2-(2-(2-(2-methoxyethoxy)ethoxy)ethoxy)methyl] propylenedioxy) thiophene).

Preparation Example 1

1.79 g (6.57 mmol, 1 eq) of Compound 2 prepared by Synthesis Example 2 above was introduced to a solution that 3.20 g (19.71 mmol, 3 eq) of iron (III) chloride was dissolved in 150 ml of methylene chloride and stirred at room temperature for 24 hours. The mixed solution was placed in an osmotic membrane having an MWCO (molecular weight of cut-off) of 5000, and then immersed in 200 ml of an acetonitrile solvent to selectively remove unreacted iron (III) chloride and Compound 2 above. The residue precipitated inside the osmotic membrane was washed with methanol and dried at room temperature to obtain a thiophene-based polymer a having a weight average molecular weight (Mw) of about 7,500 g/mol and an oxidation potential of about 2.6V to $Li/Li^+$.

Preparation Example 2

1.79 g (8.28 mmol, 1 eq) of Compound 3 prepared by Synthesis Example 3 above was introduced to a solution of 4.03 g (24.83 mmol, 3 eq) of iron (III) chloride dissolved in 150 ml of methylene chloride, and stirred at room temperature for 24 hours. The mixed solution was placed in an osmotic membrane having an MWCO (molecular weight of cut-off) of 5000, and then immersed in 200 ml of an acetonitrile solvent to selectively remove unreacted iron (III) chloride and Compound 3 above. The residue precipitated inside the osmotic membrane was washed with methanol and dried at room temperature to prepare a thiophene-based polymer b having a weight average molecular weight (Mw) of about 6,000 g/mol and an oxidation potential of about 3.1V to $Li/Li^+$.

Preparation Example 3

1.79 g (3.0 mmol, 1 eq) of Compound 4 prepared by Synthesis Example 4 above was introduced to a solution that 1.46 g (9.0 mmol, 3 eq) of iron (III) chloride was dissolved in 150 ml of methylene chloride, and stirred at room temperature for 24 hours. The mixed solution was placed in an osmotic membrane having an MWCO (molecular weight of cut-off) of 5000, and then immersed in 200 ml of an acetonitrile solvent to selectively remove unreacted iron (III) chloride and Compound 4 above. The residue precipitated inside the osmotic membrane was washed with methanol and dried at room temperature to prepare a thiophene-based polymer c having a weight average molecular weight (Mw) of about 12,500 g/mol and an oxidation potential of about 3.0V to $Li/Li^+$.

Preparation Example 4

0.82 g (3.0 mmol, 1 eq) of Compound 2 prepared by Synthesis Example 2 above and 1.19 g (3.0 mmol, 1 eq) of Compound 4 prepared by Synthesis Example 4 above were introduced to a solution that 2.92 g (18.0 mmol, 6 eq) of iron (III) chloride was dissolved in 150 ml of methylene chloride, and stirred at room temperature for 24 hours. The mixed solution was placed in an osmotic membrane having an MWCO (molecular weight of cut-off) of 5000, and then immersed in 200 ml of an acetonitrile solvent to selectively remove unreacted iron (III) chloride, Compound 2 above, and Compound 4 above. The residue precipitated inside the osmotic membrane was washed with methanol and dried at room temperature to obtain a thiophene-based polymer d1 having a weight average molecular weight (Mw) of about 9,400 g/mol and an oxidation potential of about 2.8V to $Li/Li^+$.

Preparation Example 5

A thiophene-based polymer d2 having a weight average molecular weight (Mw) of about 11,000 g/mol and an oxidation potential of about 2.9V to $Li/Li^+$ was prepared in the same manner as in Preparation Example 4 above, except that 0.82 g (3.0 mmol, 1 eq) of Compound 2 prepared by Synthesis Example 2 above, and 3.58 g (6.0 mmol, 2 eq) of Compound 4 prepared by Synthesis Example 4 above were introduced, and stirred at room temperature for 24 hours.

Preparation Example 6

A thiophene-based polymer d3 having a weight average molecular weight (Mw) of about 7,800 g/mol and an oxidation potential of about 2.7V to $Li/Li^+$ was prepared in the same manner as in Preparation Example 4 above, except that 1.64 g (6.0 mmol, 2 eq) of Compound 2 prepared by Synthesis Example 2 above, and 1.79 g (3.0 mmol, 1 eq) of Compound 4 prepared by Synthesis Example 4 above were introduced, and stirred at room temperature for 24 hours.

Example 1

After dispersing 1 g of the thiophene-based polymer a of Preparation Example 1 in 100 ml of NMP, 100 g of an active material core ($Li[Ni_{0.5}Co_{0.2}Mn_{0.3}]O_2$ (LG Chem)) with an average particle diameter of 5 μm was introduced, and stirred at 60° C. for 1 hour. Subsequently, the active material core was separated from the solution with a paper filter and dried in an oven at 80° C. to prepare a positive electrode active material A in which a conductive polymer layer comprising the thiophene-based polymer a was formed on the active material core. At this time, the thickness of the conductive polymer layer and the coverage to the surface of the active material core were as shown in Table 1 below.

Examples 2 to 6

Positive electrode active materials were prepared in the same manner as in Example 1, respectively, except that the thiophene-based polymers were used as shown in Table 1 below. At this time, the thicknesses of the conductive polymer layers included in the positive electrode active materials of Examples 2 to 6 above and the coverages to the surfaces of the active material cores were as shown in Table 1 below.

TABLE 1

| Classification | | Thickness of Conductive Polymer Layer (nm) | Coverage (%) |
|---|---|---|---|
| Example 1 | Thiophene-based polymer a | 6.2 | 95 |
| Example 2 | Thiophene-based polymer b | 7.0 | 90 |
| Example 3 | Thiophene-based polymer c | 8.0 | 85 |
| Example 4 | Thiophene-based polymer d1 | 6.7 | 95 |
| Example 5 | Thiophene-based polymer d2 | 7.1 | 90 |
| Example 6 | Thiophene-based polymer d3 | 7.8 | 95 |

Comparative Example 1

A positive electrode active material was prepared in the same manner as in Example 1, except that no conductive coating layer was formed on the active material core.

Example 7

75 weight % of the positive electrode active material A of Example 1, 1 weight % of a carbon-based conductive material (ECP (Ketjen Black) 0.5%, SFG (Trimrex graphite) 0.4%, and DB (Denka Black) 0.4%), 1 weight % of PVDF and 23 weight % of NMP were mixed in an agate mortar to form a positive electrode slurry. The positive electrode slurry was coated on an aluminum current collector with a thickness of 20 μm using a doctor blade to a thickness of approximately 40 μm, and then dried at room temperature, and then dried again under vacuum conditions at 120° C., and rolled to prepare a positive electrode.

In addition, 98 weight % of artificial graphite (BSG-L, Tianjin BTR New Energy Technology Co., Ltd.), 1.0 weight % of a styrene-butadiene rubber (SBR) binder (Zeon), and 1.0 weight % of carboxymethylcellulose (CMC, NIPPON A&L) were mixed, and then introduced to distilled water, and stirred for 60 minutes using a mechanical stirrer to prepare a negative electrode slurry. The negative electrode slurry was applied on a copper current collector with a thickness of 10 μm using a doctor blade to a thickness of approximately 60 μm, and then dried in a hot air dryer at 100° C. for 0.5 hours, and then dried again under vacuum conditions at 120° C. for 4 hours and rolled to prepare a negative electrode.

A battery was manufactured, together with the positive electrode and the negative electrode as prepared as above, using a polyethylene separator (Star 20) with a thickness of 20 μm and an electrolyte in which 1.15M $LiPF_6$ was dissolved in a mixed solvent of ethylene carbonate: ethylmethyl carbonate: diethyl carbonate (volume ratio of 3:3:4).

Examples 8 to 12

Batteries were manufactured in the same manner as in Example 7, except that the positive electrode active materials B to D3 of Examples 2 to 6 were used instead of the positive electrode active material A of Example 1.

Comparative Example 2

A battery was manufactured in the same manner as in Example 7, except that the positive electrode active material of Comparative Example 1 was used instead of the positive electrode active material of Example 1.

TABLE 2

| | Elution Properties (Ni elution capacity, ppm) | Rolling Density (g/cc) | Initial Capacity (mAh/g) | Capacity Retention Ratio (%) |
|---|---|---|---|---|
| Example 1 | 20 | 3.10 | — | — |
| Example 2 | 35 | 3.08 | — | — |
| Example 3 | 100 | 3.17 | — | — |
| Example 4 | 50 | 3.12 | — | — |
| Example 5 | 80 | 3.15 | — | — |
| Example 6 | 40 | 3.12 | — | — |
| Comparative Example 1 | 450 | 2.97 | — | — |
| Example 7 | — | — | 202.3 | 90 |
| Example 8 | — | — | 202.8 | 88 |
| Example 9 | — | — | 202.5 | 60 |
| Example 10 | — | — | 202.8 | 75 |
| Example 11 | — | — | 203.1 | 69 |
| Example 12 | — | — | 202.8 | 85 |
| Comparative Example2 | — | — | 202.6 | 25 |

The invention claimed is:

1. An electrode active material comprising:

an active material core; and a conductive polymer layer on a surface of the active material core, wherein the conductive polymer layer comprises a thiophene-based polymer, wherein the thiophene-based polymer has a weight average molecular weight in a range of 500 g/mol to 20,000 g/mol, wherein the thiophene-based polymer comprises a polymerization unit of Formula 3:

[Formula 3]

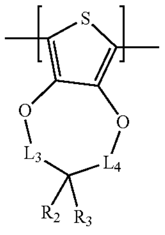

wherein $L_3$ and $L_4$ are each independently a single bond or an alkylene group, $R_2$ is a carboxyl group, a hydroxyl group, an amine group, a nitro group, an ether group, a carbonyl group, or a flowable functional group, and $R_3$ is hydrogen, a carboxyl group, a hydroxyl group, an amine group, a nitro group, an ether group, a carbonyl group, or a flowable functional group, wherein the flowable functional group is an alkyl group comprising 3 or more carbon atoms, an alkoxy group comprising 3 or more carbon atoms, a carbonyl group comprising an alkyl group comprising 3 or more carbon atoms, a carbonyloxy group comprising an alkyl group comprising 3 or more carbon atoms, or a functional group of Formula 2:

[Formula 2]

$$—L_1—O—[L_2—O]_n—R_1$$

wherein $L_1$ is a single bond or an alkylene group, $L_2$ is an alkylene group, $R_1$ is an alkyl group, and n is a number in a range of 1 to 10.

2. The electrode active material according to claim 1, wherein the active material core comprises a lithium nickel-manganese-cobalt oxide represented by Formula 1 below:

$Li_xM_yO_2$ [Formula 1]

wherein M is represented by $Ni_{1-a-b}Mn_aCO_b$, a is in a range of 0.05 to 0.4, b is in a range of 0.05 to 0.4, 1-a-b is in a range of 0.2 to 0.9, x is 0.95 to 1.15, and y is 2-x.

3. The electrode active material according to claim 1, wherein in the thiophene-based polymer, a ratio (M/S) of a mole number (M) of one or more functional groups selected from the group consisting of a carboxyl group, a hydroxyl group, an amine group, a nitro group, an ether group, a carbonyl group, and a flowable functional group relative to a mole number(S) of sulfur is in a range of 0.1 to 10.

4. The electrode active material according to claim 1, wherein the thiophene-based polymer simultaneously comprises a first functional group selected from the group consisting of a carboxyl group, a hydroxyl group, an amine group, a nitro group, an ether group, and a carbonyl group, and a second functional group which is the flowable functional group.

5. The electrode active material according to claim 4, wherein in the thiophene-based polymer, a ratio ((M1+M2)/S) of a sum of a mole number (M1) of the first functional group (M1) and a mole number (M2) of the second functional group to a mole number (S) of sulfur is in a range of 0.1 to 10.

6. The electrode active material according to claim 1, wherein at least one of $L_3$ and $L_4$ is an alkylene group and a number of carbon atoms present in $L_3$ and $L_4$ is in a range of 2 to 10.

7. The electrode active material according to claim 1, wherein the thiophene-based polymer simultaneously comprises a polymerization unit of Formula 4 below and a polymerization unit of Formula 5 below:

[Formula 4]

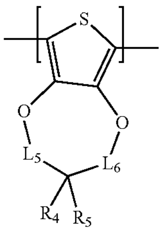

wherein $L_5$ and $L_6$ are each independently a single bond or an alkylene group, $R_4$ is a carboxyl group, a hydroxyl group, an amine group, a nitro group, an ether group, or a carbonyl group, and $R_5$ is hydrogen, a carboxyl group, a hydroxyl group, an amine group, a nitro group, an ether group, or a carbonyl group:

[Formula 5]

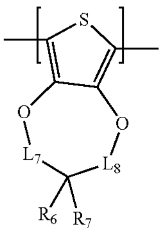

wherein $L_7$ and $L_8$ are each independently a single bond or an alkylene group, $R_6$ is a flowable functional group, and $R_7$ is hydrogen or a flowable functional group wherein the flowable functional group is an alkyl group comprising 3 or more carbon atoms, an alkoxy group comprising 3 or more carbon atoms, a carbonyl group comprising an alkyl group comprising 3 or more carbon atoms, a carbonyloxy group comprising an alkyl group comprising 3 or more carbon atoms, or a functional group of Formula 2:

[Formula 2]

$$—L_1—O—[L_2—O]_n—R_1$$

wherein $L_1$ is a single bond or an alkylene group, $L_2$ is an alkylene group, $R_1$ is an alkyl group, and n is a number in a range of 1 to 10.

8. The electrode active material according to claim 7, wherein a ratio (M4/M5) of a mole number (M4) of the polymerization unit of Formula 4 to a mole number (M5) of the polymerization unit of Formula 5 is in a range of 0.1 to 10.

9. The electrode active material according to claim 1, wherein the thiophene-based polymer has an oxidation potential in a range of 2.0V to 4.2V.

10. The electrode active material according to claim 1, wherein a coverage of the conductive polymer layer to the active material core is 80% or more.

11. The electrode active material according to claim 1, wherein the conductive polymer layer has a thickness in a range of 1 nm to 1 μm.

12. The electrode active material according to claim 1, comprising 0.1 to 150 parts by weight of the conductive polymer layer relative to 100 parts by weight of the active material core.

13. A method of manufacturing an electrode active material comprising a step of mixing a thiophene-based polymer with an active material core, wherein the thiophene-based polymer has a weight average molecular weight in a range of 500 g/mol to 20,000 g/mol, wherein the thiophene-based polymer comprises a polymerization unit of Formula 3:

[Formula 3]

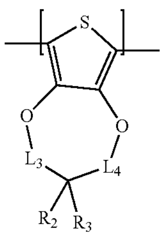

wherein $L_3$ and $L_4$ are each independently a single bond or an alkylene group, $R_2$ is a carboxyl group, a hydroxyl group, an amine group, a nitro group, an ether group, a carbonyl group, or a flowable functional group, and $R_3$ is hydrogen, a carboxyl group, a hydroxyl group, an amine group, a nitro group, an ether group, a carbonyl group, or a flowable functional group, wherein the flowable functional group is an alkyl group comprising 3 or more carbon atoms, an alkoxy group comprising 3 or more carbon atoms, a carbonyl group comprising an alkyl group comprising 3 or more carbon atoms, a carbonyloxy group comprising an alkyl group comprising 3 or more carbon atoms, or a functional group of Formula 2:

[Formula 2]

$$-L_1-O-\!\left[L_2-O\right]_n\!-R_1$$

wherein $L_1$ is a single bond or an alkylene group, $L_2$ is an alkylene group, $R_1$ is an alkyl group, and n is a number in a range of 1 to 10.

14. The method of manufacturing an electrode active material according to claim 13, wherein the thiophene-based polymer is formed by polymerizing a thiophene-based monomer comprising one or more functional groups selected from the group consisting of a carboxyl group, a hydroxyl group, an amine group, a nitro group, an ether group, a carbonyl group, and a flowable functional group in a presence of an oxidizing agent.

15. The method of manufacturing an electrode active material according to claim 14, wherein the thiophene-based monomer is represented by Formula 6 below:

[Formula 6]

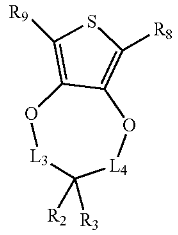

wherein $L_3$ and $L_4$ are each independently a single bond or an alkylene group, $R_2$ is a carboxyl group, a hydroxyl group, an amine group, a nitro group, an ether group, a carbonyl group, or a flowable functional group, $R_3$ is hydrogen, a carboxyl group, a hydroxyl group, an amine a group, a nitro group, an ether group, a carbonyl group, or a flowable functional group, and $R_8$ and $R_9$ are each independently hydrogen or halogen wherein the flowable functional group is an alkyl group comprising 3 or more carbon atoms, an alkoxy group comprising 3 or more carbon atoms, a carbonyl group comprising an alkyl group comprising 3 or more carbon atoms, a carbonyloxy group comprising an alkyl group comprising 3 or more carbon atoms, or a functional group of Formula 2:

[Formula 2]

$$-L_1-O-\!\left[L_2-O\right]_n\!-R_1$$

wherein $L_1$ is a single bond or an alkylene group, $L_2$ is an alkylene group, $R_1$ is an alkyl group, and n is a number in a range of 1 to 10.

16. An electrode, comprising:

a current collector; and an electrode active material layer formed on one side of the current collector, wherein the electrode active material layer comprises the electrode active material of claim 1, a conductive material, and a binder.

* * * * *